United States Patent [19]

Lee et al.

[11] Patent Number: 5,013,447
[45] Date of Patent: May 7, 1991

[54] PROCESS OF TREATING ALCOHOLIC BEVERAGES BY VAPOR-ARBITRATED PERVAPORATION

[75] Inventors: Eric K. Lee, Acton; Vinay J. Kalyani, Tewksbury; Stephen L. Matson, Harvard, all of Mass.

[73] Assignee: Sepracor, Marlbrough, Mass.

[21] Appl. No.: 463,098

[22] Filed: Jan. 10, 1990

Related U.S. Application Data

[60] Continuation-in-part of Ser. No. 382,615, Jul. 19, 1989, which is a division of Ser. No. 296,255, Jan. 12, 1989, Pat. No. 4,933,198, which is a continuation-in-part of Ser. No. 897,489, Aug. 18, 1986, Pat. No. 4,816,407, which is a division of Ser. No. 786,787, Oct. 11, 1985, Pat. No. 4,778,688.

[51] Int. Cl.$^5$ .............................................. B01D 61/36
[52] U.S. Cl. ........................................ 210/640; 55/16; 210/644; 210/651; 426/14
[58] Field of Search ............... 210/634, 640, 644, 649, 210/650, 651, 652; 55/16, 158; 426/11, 14

[56] References Cited

U.S. PATENT DOCUMENTS

| | | |
|---|---|---|
| 2,611,490 | 9/1953 | Robinson ............................. 210/150 |
| 3,186,917 | 6/1965 | Gerhardt et al. |
| 3,201,328 | 8/1965 | Williams ............................. 195/141 |
| 3,275,528 | 9/1966 | Ainis ................................... 195/104 |
| 3,291,613 | 12/1966 | Raible . |
| 3,335,545 | 8/1967 | Robb et al. ............................ 55/16 |
| 3,502,651 | 3/1970 | Oldenburg . |
| 3,552,574 | 1/1971 | Lowe et al. |
| 3,634,128 | 1/1972 | Bolin .................................... 99/205 |
| 3,847,163 | 11/1974 | Molyneux ........................... 131/143 |
| 3,865,960 | 2/1975 | Wucherpfennig et al. |
| 3,865,961 | 2/1975 | Wucherpfennig et al. |
| 3,915,820 | 10/1975 | Kominek . |
| 4,015,020 | 3/1977 | Nagasawa et al. |
| 4,083,904 | 4/1978 | Sano et al. |
| 4,218,312 | 8/1980 | Perry ................................. 210/22 C |
| 4,311,594 | 1/1982 | Perry ................................... 210/640 |
| 4,401,678 | 8/1983 | Beaumont . |
| 4,405,652 | 9/1983 | Boucher ............................. 426/494 |
| 4,499,117 | 2/1985 | Bonneau ............................ 426/592 |
| 4,532,140 | 7/1985 | Bonnome ............................ 426/13 |
| 4,539,117 | 9/1985 | Meyer et al. ........................ 210/639 |
| 4,581,236 | 4/1986 | Bandel et al. ....................... 426/14 |
| 4,591,440 | 5/1986 | Higashimura et al. ............. 210/640 |
| 4,610,791 | 9/1986 | Henne et al. |
| 4,610,887 | 9/1986 | Galzy et al. |
| 4,612,196 | 9/1986 | Goldstein et al. |
| 4,617,127 | 10/1986 | Light . |
| 4,650,574 | 3/1987 | Hilgendorff et al. ............... 210/180 |
| 4,655,927 | 4/1987 | Ford .................................. 210/639 |
| 4,755,299 | 7/1988 | Bruschke et al. ................... 210/640 |

FOREIGN PATENT DOCUMENTS

| | | |
|---|---|---|
| 28769 | 5/1981 | European Pat. Off. |
| 0332738 | 9/1989 | European Pat. Off. |
| 51-26399 | 8/1976 | Japan . |
| 60-106504 | 6/1985 | Japan . |
| 1079517 | 8/1967 | United Kingdom . |

OTHER PUBLICATIONS

Sanders and Choo, 1960, Petroleum Refiner, 39: 134-136.
Mulder et al., J. Membrane Sci. 16:269 (1983).
Neel and Aptel, Entropie No. 104:15 (1982).
Neel et al., Entropie No. 104:27 (1982).
Benly, "The Treatment of Waste Emulsified Oils by Ultrafiltration", Filt. and Sep. Jan./Feb. 1977, pp. 53-55.
Jameson, T. A.; Meltzer, T. H. "A Review of Cellulosic Membrane Applications to Air, Water and Biological Fluids Filtration " *Appl. Polym. Symp.* 1970, 13, 267-283.

(List continued on next page.)

Primary Examiner—Frank Sever
Attorney, Agent, or Firm—Stanton T. Lawrence, III

[57] ABSTRACT

The method and apparatus of the present invention has general applicability to the manipulation of the concentration, by partial depletion or enrichment, of one or more volatile components in a given liquid while leaving the other volatile components in the liquid in a substantially undisturbed or unadulterated state.

40 Claims, 16 Drawing Sheets

OTHER PUBLICATIONS

"Hollow-Fiber Membranes," Kirk-Othmer, *Encyclopedia of Chemical Technology*, Third Edition, vol. 12, pp. 492-513 (1984).

"Reverse Osmosi," Kirk-Othmer, *Encyclopedia of Chemical Technology*, Third Edition, vol. 20, pp. 230-242 (1984).

"In Search of the Perfect Membrane," *High Technology* 1983, Nov. 72.

Staude, E. "Polymere fur die Separation mit Membranen," *Die Angewandte Makromolekulare Chemie* 1982, 109/110, 139-164.

Pusch, W.; Walch, A. "Synthetic Membranes-Preparation, Structure, and Application," *Angew. Chem. Int. Ed. Engl.* 1982, 21, 660-685.

Kesting, R. E. *Synthetic Polymeric Membranes* Puropore Incorporated, Tustin Calif., pp. 4-5, 296-299 (1981).

Huang, R. Y. M.; Jarvis, N. R. "Separation of Liquid Mixtures by Using Polymer Membranes, II., Permeation of Aqueous Alcohol Solutions Through Callophane and Poly(Vinyl Alcohol)," *J. Appl. Polm. Sci.* 1970, II, 2341-2356.

Tealdo, G. C.; Canepa, P.; Munari, S. "Water-Ethanol Permeation Through Grafted PTFE Membranes," *J. Memb. Sci.*, 1981, i, 191-196.

Wilke, C. R.; Maiorella, B. "High Productivity Anaerobic Permentation with Dense Cell Cultue," *Adv. Biotechnol.*, (Proc. Int. Ferment. Symp.) 1981, 1, 539-545.

Kyung, K. H.; Gerhardt, P. "Continuous Production in Ethanol by Yeast 'Immobilized' in Membrane-Contained Fermentor,'" Biotechnol. Bioeng., 1984, 26, 252-256.

Gregor, H. P.; Jeffries, T. W. "Ethanolic Fuels from Renewable Resources in The Solar Age," *Ann. N.Y. Acad., Sci.* 1979, 326, 273-287.

Meltzer, T. H.; Gutfreund, K.; Kulshrestha, V. K.; Stake, A. M. "Optimized Cellulose Membranes for Artificial Kidney Dialysis Applications," *Trans Amer. Soc. Artif. Int. Organs*, 1968, 14, 12-18.

Klein, E.; Holland, F.; Lebeouf, A.; Donnaud, A.; Smith, J. K. "Transport and Mechanical Properties of Hemodialysis Hollow Fibers," *J. Memb. Sci.* 1976, 1, 371-396.

"Dextrose and Starch Syrups," Kirk-Othmer, *Encyclopedia of Chemical Technology*, Third Edition, vol. 7, pp. 564-577 (1984).

Symbas, P. N.; Tyras, D. H.; Baldwin, B. J. "Left Ventricular Function During Acute Ethanol Intoxication and Hemodialysis," J. Surgical Res. 1973, 15, 207-211.

Gardner, C. R. "Biomedical Applications of Membrane Processes," in *Membrane Separation Processes* Meares, P., Ed., Elsevier Scientific Publishing Company, Amsterdam, pp. 540-542 (1976).

Colton, C. K.; Lowrie, E. G., "Hemodialysis: Physical Principles and Technical Considerations," in the Kidney 2nd Edition, Brenner, B. M.; Rector, Jr., F. C., Eds., vol. II, pp. 2425-2474 (1981).

Margaritis, A.; Wilke, C. R., "The Rotorfermentor. I. Description of the Apparatus, Power Requirements, and Mass Transfer Characteristics," *Biotechnol. Bioeng.* 1978, 20, 709-726.

Margaritis, A.; Wilke, C. R. "The Rotorfementor. II. Application to Ethanol Ermentation," *Biotechnol. Bioeng.* 1978, 20, 727-753.

Michaels, A. S., "New Separation Techinque for the CPI," *Chem. Engin. Prog.* 1968, 64, 31-43.

Lonsdale, H. K., "The Growth of Membrane Technology," *J. Memb. Sci.* 1982, 10, 81-181.

Messing, R. A., "The Potential Applicaticns of Molecular Inclusion to Beer Processing," *The Brewers Digest* 1971, Dec., 60-63.

Harrison, P. S. "Reverse Osmosis and Its Applications to the Food Industry," *Food Trade Review* 1970, Nov. 33-37.

Porter, M. C.; Michaels, A. S. "Membrane Ultrafiltration," *Chem. Tech.* 1971, Jan., 56-63.

Pierrard, P., "Recents Progress en Electrodialyse," Industries Aliment. *Agric.* 1976, 569-681.

Shpritsman, E. M.; Gavrilyuk, V. S. "Controlling Wine Acidity by Electrodialysis," *Sadovod. Vinograd. Vinodel. Mold.* 1975, 30(4), 25-28.

Ng, P. K.; Mitra, G.; Lundhlad, J. L. "Simultaneous Salt and Ethanol Removal from Human Serum Albumin," *J. Pharmaceut. Sci.* 1978, 67(3), 431-433.

Jaeger, P.; Puespoek, J. "Low-Alcohol Beers and Low-Alcohol Beverages with Beer Character," *Mitt. Versuchsstn. Gaerungsgewerbe Wien* 1978, 32(3-3), 95-97.

(List continued on next page.)

OTHER PUBLICATIONS

Niefind, H. J.; Schmitz, F. J. "New Process for Reducing Alcohol Content of Beer by Selective Diffusion Through Membranes," *Proceedings, European Brewery Convention* 1981, 599-606.

Wucherpfennig, K.; Neubert, S. "Zur Teilweisen Entalkoholisierung von Bier Mittels Umkehrosmose," *Brauwelt Jg.* 1976, 116(47), 1573-1579.

Postel, W.; Prasch, E. "Untersuchungen zur Weinsteinstabilisierung von Wein durcl Elektrodialyse," *Die Weinwirtschaft* 1978, TM. 28-32.

Paronetto, L.; Paronetto, L.; Braido, A. "Alcune Prove di Stabilizzazione Tartarica di Mosti e Eini Mediante l'Elettrodialisi," *Vignevini* 1977, 4(11), 9-15.

Wucherprennig, K.; Millies, K. D., "Uber den Einfluss der Elektrodialysebehandlung zum Zwecke der Weinsteinstabilisierung auf die Konzentration der Aminosauren im Wein," *Mitterlungen: Rebe, Wein, Costbau und Fruechteverwertung* 1976, 26(1), 13-26.

Wucherprennig, K. "Possibilities d'Application de Procedes Utilisant des Membranes pour la Stabilisation des Vins (Ultrafiltration, Osmose Inverse, Electrodialyse)," *Ann. Technol. Agric.* 1978, 27(1), 319-331.

Wucherpfennig, K., "Possibilities d'Utilisation de Processus Membranaires dans l'Industrie des Boissons (Osmose Inverse, Ultrafiltration, Electrodialyse)," *Bulletin de l'O.I.V.* 1980, 589, 187-208.

Mercz, A. "Applications of Membrane Processes in Winemaking," *Borgazdasag* 1976, 24(2), 55-60.

Toth, M. "Use of Autoanalyzer for Analytical Measurements in the Beer Industry, IV.," *Soripar* 1979, 26, 18-24.

Coulman, G.A.; Stieber, R. W.; Gerhardt, P. "Dialysis Continuous Process for Ammonium-Lactate Fermentation of Whey: Mathematical Model and Computer Simulation," *Appl. Environ. Microbiol.* 1977, 34(b), 725-732.

PROCESS OF TREATING ALCOHOLIC BEVERAGES BY VAPOR-ARBITRATED PERVAPORATION

CROSS-REFERENCE TO RELATED APPLICATIONS

The present application is a continuation-in-part of applicants' prior co-pending U.S. application Ser. No. 07/382,615, filed July 19, 1989, now pending which is a division of applicants' prior U.S. application Ser. No. 07/296,255, filed Jan. 12, 1989, now U.S. Pat. No. 4,933,198 which, in turn, is a continuation-in-part of applicants' prior U.S. application Ser. No. 897,489, filed Aug. 18, 1986, now U.S. Pat. No. 4,816,407, which is a division of applicants' prior U.S. application Ser. No. 786,787, filed Oct. 11, 1985, now U.S. Pat. No. 4,778,688, the disclosures of which are incorporated by reference herein in their entirety.

TABLE OF CONTENTS

1. Field of the Invention
2. Background of the Invention
   2.1 Alcohol Reduction
      2.1.1 Fermentation Control Methods
      2.1.2 Evaporation Methods
      2.1.3 Membrane Distillation Methods
      2.1.4 Pressure-Driven Methods
      2.1.5 Solvent Extraction and Membrane Extraction Methods
      2.1.6 Conventional Pervaporation Methods
   2.2 Enrichment of Alcohol and/or Flavor and Aroma
3. Summary of the Invention
4. Brief Description of the Figures
5. Detailed Description of the Invention
   5.1 Alcohol Reduction
      5.1.1 Vapor-Swept Systems
      5.1.2 Vacuum Systems
   5.2 Alcohol Enrichment
      5.2.1 Vapor-Swept Systems
      5.2.2 Vacuum Systems
   5.3 Flavor and Aroma Enrichment
      5.3.1 Vapor-Swept Systems
      5.3.2 Vacuum Systems
   5.4 Vapor Arbitration for Components Other Than Ethanol and Water
   5.5 Membranes
6.1 Example Nos. 1-2
6.2 Example Nos. 3-4
6.3 Example Nos. 5
6.4 Example Nos. 6-7
6.5 Example No. 8
6.6 Example No. 9

1. FIELD OF THE INVENTION

This invention relates to novel methods and apparatus for manipulating the concentration of volatile components in a liquid, in particular the ethanol content in alcoholic beverages such as wines, distilled spirits, beers, and sparkling wines etc. by selectively removing at least one preselected member of a plurality of volatile components present in the liquid while a substantial portion of the remaining members of the plurality of volatile components is retained in the liquid. The present method and apparatus allows for the selective removal of, for example, water, ethanol, or the simultaneous removal of water and ethanol, in any desired proportion, including that which corresponds to the ethanol concentration of the original beverage. In each case, ingredients some of which are volatile, that contribute to the flavor, aroma, body and even color of the starting liquid are substantially retained in the product liquid or beverage. In the examples, above, the resulting beverages thus become, respectively, alcohol-reduced, alcohol-enriched, or unaltered in alcohol content but enhanced in flavor and aroma consequent to the volume decrease in the beverage. The process of this invention, referred to as vapor-arbitrated pervaporation (VAP), is capable of accomplishing such diverse objectives depending on the chosen process conditions.

In short, the invention has general applicability to the manipulation of the concentration, by partial depletion of one or more volatile components in a given liquid while leaving the other volatile components in the liquid in an enriched, but otherwise substantially undisturbed or unadulterated, state.

2. BACKGROUND OF THE INVENTION

Water and ethanol are the major components in alcoholic beverages. Typically, multiple minor components are also present that are responsible for the characteristic flavor and aroma of the beverages; these minor components are sometimes referred to collectively as congeners. There have been many attempts to process the beverages further after they are produced. Such processing may be aimed at decreasing the ethanol content to obtain low-alcohol beverages. Alternatively, another objective might be to increase the ethanol content of the beverage. Yet another objective is to enhance the intensity of the beverages by increasing the concentration of the congeners. In cases where the objective is to adjust the alcohol content of the beverage, it is desirable to retain as much of the flavor and aroma compounds as possible in order that the character of the beverage remains substantially unchanged. Before discovery of the present invention, however, none of the above-stated objectives was possible without the loss of significant amounts of native volatile components, including water, alcohol and congeners during the implementation of a process intended to reduce the presence of one of these volatile components.

2.1 ALCOHOL REDUCTION

Much of the further processing performed on marketable alcoholic beverages are aimed at alcohol reduction. This is due, in part, to the developing trend toward beverages of lower alcohol content indicating the public's increasing health-consciousness and to the social and legislative initiatives against alcohol abuse, including drunk driving. Changes in demographics and consumer preferences have also led to the contraction of some segments of the liquor and spirits business.

In response, makers of alcoholic beverages have introduced some low-alcohol versions of their products to the market. These products are made either by altering the fermentation process to generate less ethanol, or by treating conventionally made beverages to remove part of their alcohol content. However, most consumers have found such low-alcohol beverages to be of inferior quality and taste compared with their normal-alcohol-content counterparts. The need exists, therefore, for improved technologies capable of reducing alcohol content effectively while preserving the character of the original beverage.

2.1.1 FERMENTATION CONTROL METHODS

A variety of methods are known for controlling the ethanol content during the fermentation stage of the beverage production process. Some involve decreasing the quantity of carbohydrates available to the fermentation microbes for conversion into ethanol. For example, Lang et al., in European Patent No. 177,282, separated a fruit juice into a high-sugar fraction and a low-sugar fraction, fermenting only the latter, and returned some of the volatile components from a distillate of the high-sugar fraction. Villettaz, in U.S. Pat. No. 4,675,191, enzymatically oxidized part of the glucose in grape juice prior to fermentation. Roquette, in U.S. Pat. No. 4,680,180, replaced a portion of the malt used to make beer by a hydrogenated starch hydrolyzate. Other methods involve altering the yeast used for fermentation. For example, Dziondziak, in U.S. Pat. No. 4,814,188, produced low-alcohol beer by conducting fermentation with an alcohol dehydrogenase-negative yeast mutant incapable of forming ethanol but capable of forming glycerol, then blended the product with normally produced beer. In a patent assigned to Soken, K. K., Japan Patent No. 60-186273, rice malt was fermented with wine yeast to make a low-alcohol sake. Forrest et al., as described in British Patent No. 2,181,450, utilized alpha amylase instead of beta amylase to make low alcohol beer.

Common to these methods is the altered composition of the fermentation product compared with that yielded by traditional fermentation techniques. This typically results in discernible differences in the organoleptic qualities of the products.

2.1.2 EVAPORATION METHODS

Excess alcohol may also be removed from a beverage by evaporation. For example, light beer may be produced by boiling regular beer for a number of hours to drive off much of the alcohol. Hoynup, "Beer," in Kirk-Othmer *Encyclopedia of Chemical Technology*, Vol. 3, pp. 692-735 (3rd Ed. 1978). Such protracted heating of wine would degrade many of the constituents that contribute to its flavor, color, and bouquet. With beer, flavor that is lost by boiling may be restored to some degree by the addition of aroma substances recovered from yeast (German Patent No. 1,767,040). However, there exists no such remedy for restoring the flavor of thermally damaged wine.

Boiling the beverage also causes a substantial loss of water. That water loss poses no problem for beer because it can simply be reconstituted by the addition of replacement water. Dilution of wine with make-up water, however, is restricted or prohibited by the U.S. Bureau of Alcohol, Tobacco, and Firearms and in most foreign countries. See, 49 Fed. Reg. 37510-37530, (Sept. 24, 1984). Other methods for producing low-alcohol beer that also cause the removal of water, such as vacuum distillation and reverse osmosis, may likewise not be applicable to wine because of this and similar regulations. Where the ethanol content of distilled spirits such as whiskies is reduced by dilution with water, the product must be labeled as "diluted," making it undesirable from a marketing standpoint.

Efforts have been made to produce low ethanol wine through flash evaporation (Boucher, U.S. Pat. No. 4,405,652). The beverage was heated and passed rapidly through a centrifugal evaporator under partial vacuum where the ethanol was vaporized and removed. Other evaporative processes have been proposed for alcohol reduction. For example, Hurley, British Patent No. 2,084,607, described steam stripping of wines, cider, or beer under partial vacuum and temperatures up to 60° C. Boch et al., in German Patent No. 3,506,820, applied a vacuum distillation process for removal of ethanol from sparkling wines. The main drawback of these processes is that they do not discriminate between ethanol and other volatile components in the beverage in particular; in particular, aroma components are depleted together with the ethanol. In addition, even brief exposure of wines to high temperatures can degrade certain flavor and aroma components or caramelize sugars in those beverages. The resultant burnt taste can be distinct, objectionable, and difficult to mask by blending with other beverage ingredients.

2.1.3 MEMBRANE DISTILLATION METHODS

The technique of membrane distillation involves separating volatile components from a liquid into a gaseous extraction media through a microporous membrane. The membrane impedes passage of liquid but not vapor, and functions essentially as a phase separator which does not impart any permselectivity. As such, the degree of ethanol reduction made possible by this technique is governed by the state of vapor-liquid equilibrium which exists in the absence of the membrane. In a variation of the membrane distillation technique, Japan Patent No. 01-023882, issued to Japan Organo K.K., an ethanol-absorbing solution was deployed on the side of the membrane opposite the beverage to receive the vaporized alcohol. Here, too, removal of other volatile substances was possible to the same extent as that found with other evaporative methods described supra. Although applicable to the dealcoholization of beer, where a larger part of the organoleptic quality is associated with taste than with aroma, the same processing method would have much less utility in treating wines or distilled spirits in which aromatic components play much more important roles in establishing the character and body of those beverages. A further drawback of this technique is that microporous membranes, including hydrophobic ones made from fluoropolymers, may be wetted through at the high alcohol concentrations typically found in distilled spirits. When this occurs, the ability of the membranes to separate the beverage from the ethanol-absorbing liquid is lost.

2.1.4 PRESSURE-DRIVEN METHODS

Reverse osmosis is a pressure-driven membrane process usually operating at ambient or sub-ambient temperatures that has been used commercially for alcohol reduction of beverages. Alcohol removal is achieved by simultaneous removal of ethanol and water by pressurizing the beverage against a membrane with limited ethanol/water selectivity (Bui et al., 1986, Am. J. Enol. Vitic., 37: 297, and Light et al., 1985, AIChE Symp. Ser. 250, No. 82, Recent Advances in Separation Techniques and Light, in U.S. Pat. No. 4,617,127). To compensate for the water loss, the beverage is diluted with water prior to alcohol reduction, or water could be added to the concentrated product after processing to replace the volume originally occupied by ethanol and water. Either approach involved exchanging part or most of the native water contained in the beverage. Loss of volatile flavor components is frequently observed when water is removed together with ethanol from the beverage. This phenomenon may be explained on the basis of "flow-coupling," where the passage of one permeant is coupled with the direction and rate of diffusion of another permeant. Alcohol reduction processes requiring water exchange or alternative means of reconstitution can thus be expected to alter the flavor-/aroma profiles and lead to anomalous organoleptic qualities in the beverage. Another consideration is that the water used for pre-dilution or reconstitution must be thoroughly purified so as to minimize introduction of foreign materials or impurities into the beverage. The resource needs associated with generating a high quality water supply can be substantial.

Recent developments in reverse osmosis are aimed at solving some of these problems. Dick et al., U.S. Pat. No. 4,806,366, used two coupled reverse osmosis systems to convert wine into fractions of high and low alcohol content. Two membranes exhibiting substantially different ethanol permeabilities were used to generate two separate permeate streams of higher alcohol content and lower alcohol content compared with the original beverage. In a complex cross feedback scheme, the permeate stream from each reverse osmosis system was recycled to the feed stream of the other reverse osmosis system, while the retentate streams were removed as product. There was no net loss of water or ethanol from the process; the two membranes with their different ethanol/water selectivities served to distribute the ethanol unevenly into the two retentate product streams. In principle, this should result in an alcohol-reduced beverage and an alcohol-enriched beverage containing all of the ingredients of the starting beverage. In practice, however, there are major limitations to the implementation of this concept. For efficient operation, for example, the alcohol reduction part of the process should be equipped with a membrane that is virtually impermeable to ethanol and yet insufficiently permeable to water to achieve reasonable fluxes. Very few membranes possess such properties. Even membranes considered selective for separating ethanol from water seldom exhibit ethanol rejections above 90%, particularly at moderate to high feed concentrations. (Rejection is a common measure of selectivity of a reverse osmosis membrane, defined as $((C_f-C_p)/C_f) \cdot 100\%$, where $C_f$ and $C_p$ are the steady-state solute concentrations in the feed and in the permeate, respectively.) The ethanol-impermeable membrane, cited as an example in U.S. Pat. No. 4,806,366, showed only a 50% ethanol rejection toward a 2 vol% ethanol feed at 50 to 60 bar applied pressure. This level of selectivity can be expected to decrease at the higher alcohol concentrations more representative of wines, i.e. 10 to 14 vol%, and likely becoming non-selective at the 40 vol% or higher alcohol concentrations found in distilled spirits. Managing the interaction between the two reverse osmosis systems and matching the operating conditions to the characteristics of each membrane also add to the complexity of this process.

More recently, Weiss, in U.S. Pat. No. 4,812,232, described an alternate hybrid reverse osmosis/distillation process for alcohol reduction. Permeate generated by reverse osmosis treatment of a feed wine was vacuum distilled to separate ethanol from the water, which was recycled to the feed beverage. Water obtained by vacuum distilling an additional quantity of wine was also used to replace the volume lost during alcohol reduction. The advantage of this process is that only water natively present in the wine is used for reconstitution. However, a relatively large quantity of permeate has to be distilled and the need to install and operate two vacuum distillation units significantly adds to the overall processing cost of alcohol reduction.

2.1.5 SOLVENT EXTRACTION AND MEMBRANE EXTRACTION METHODS

Conventional solvent extraction technology has long been applied to the recovery of ethanol from aqueous solutions in industry (Schiebel, 1950, Industrial & Engineering Chemistry 42: 1497-1508). This technology, however, is not directly applicable to the production of low-alcohol wines or other beverages. There would invariably be excessive solubility of the extraction solvent in the wine and, hence, contamination. Emulsification and physical entrainment might also occur (Hartline, 1979, Science 206: 41-42). Furthermore, with most extraction solvents it is expected that numerous other organic constituents of the wine or other alcoholic beverage would be coextracted along with the ethanol, thereby creating a wholly unacceptable product.

Membrane extraction, in which a membrane is interposed between a solvent containing a solute to be extracted and a second, immiscible extraction solvent, prevents the solvent entrainment and emulsion formation problems inherent to conventional solvent extraction technology. For example, Kim, in U.S. Pat. No. 4,443,414, used a microporous membrane to extract molybdenum from solutions containing molybdenum and other mineral ions. Lee et al., in U.S. Pat. No. 3,956,112, described a membrane solvent extraction system for general application based upon the use of a non-porous membrane. The membrane was solvent-swollen, so that one of two substantially immiscible liquids which the membrane separated caused the membrane to swell, forming an intermediary zone through which diffusion of solute material could occur. Ho et al., in U.S. Pat. No. 3,957,504, used an ion-exchange membrane in the manner of Lee et al. to recover metal ions from an aqueous solution.

Because the above membrane solvent extraction systems involve the use of solvent-swollen membranes, they do not prevent the molecular diffusion of dissolved solvent into the aqueous phase. Furthermore, the membranes of the prior systems show no permselectivity for the solutes to be removed. Instead, any observed selectivity is due to the choice of the extraction solvent or to the inclusion of chelating agents in the solvent that are selective for the metal ions that are to be extracted. Finally, the organic extraction solvents employed by Ho et al., and Lee et al. would be quite unsuitable for the production of beverages such as low-alcohol wines, distilled spirits, and beers for the reason that even minor amounts of these solvents, when dissolved in the aqueous phase, would represent sometimes toxic and invariably unacceptable contaminants or adulterants in the beverage.

To avoid using solvents, Tilgner et al., in U.S. Pat. No. 4,664,918, used alcohol-free fruit drinks or alcohol-reduced fermented drinks as ethanol extractants in a dialysis process. While ethanol can be removed effectively this way, the drinks used as dialyzing solution may contain components that are not part of the beverage whose alcohol content is to be reduced. Diffusion of such substances into the beverage can alter its organoleptic profile. Furthermore, water can permeate freely across the membrane because both the beverage and the dialyzing drink are aqueous. Unless the osmolality of the two phases are critically balanced, the beverage may experience a net gain or loss of its water content.

Much of the objections to conventional solvent extraction or solvent-swollen membrane extraction can be overcome by the processes described by Matson, in U.S. Pat. No. 4,778,688, in which semipermeable membranes and extraction fluids were used to extract ethanol selectively from alcoholic beverages, while leaving substantially intact the complement of other organic constituents that contribute to the color, aroma, and taste of the beverage. Suitable extraction fluids are non-toxic, water-immiscible organic solvents or aqueous solutions of low-molecular-weight but membrane-impermeable solutes. Since the extraction fluid does not absorb water to an appreciable extent, virtually all of the water natively present in the beverage is preserved, and the beverage produced in this manner is superior to those by other approaches. However, diffusional transfer of ethanol from the beverage through the membrane into a liquid extraction fluid can be relatively slow if that fluid is more viscous than the beverage. This slow rate can result in low productivity and high costs. Juxtaposing the liquid extraction fluid and the beverage across the membrane also poses the risk that the liquid extractant may enter the beverage if defects develop in the membrane or membrane device, or in the event of membrane failure. Hence product contamination remains a possibility.

2.1.6 CONVENTIONAL PERVAPORATION METHODS

Removal of the liquid extractant from the permeate side of the membrane solves the problem of product contamination due to liquid extractant intrusion. This condition is met by pervaporation processes. Pervaporation can best be described as membrane-mediated evaporation. Mulder et al., 1983, J. Membrane Sci. 16: 269–284; and Néel et al., 1985, Desalination 53: 297–326. A beverage solution is fed to one side of a membrane. Selected volatile components in the beverage solution diffuse across the membrane to the permeate side which is evacuated or continuously swept with an inert, non-condensable gas stream. The volatile components are thus removed by evaporation. Selectivity in pervaporation is governed by the permselectivity of the membrane and not the relative volatility of the components, in contrast to evaporative or membrane distillation processes. For this reason, pervaporation can accomplish selective removal of ethanol over other volatile components if a membrane permselective toward ethanol is used. In conventional implementations of pervaporation, a hydrophobic membrane with low water permeability is used to limit water loss. The result is significant loss of non-polar volatile components because of their solubility in, and ability to permeate across, the similarly non-polar polymer membrane. Using a hydrophilic membrane instead of a hydrophobic membrane helps preserve those non-polar components in the feed beverage, but the consequent water loss would introduce problems similar to those with reverse osmosis, i.e., the need to exchange part or most of the native water in the beverage. Generally speaking, membrane materials with good ethanol permeability also exhibit some water permeability because of the chemical similarities between the two components; the water-barrier property of such membranes is necessarily compromised. For these reasons, beverages produced via conventional pervaporation are characterized by low quality.

The behavior of typical vacuum-based pervaporation systems specifically operated for alcohol reduction illustrate these trade-offs. Brüschke et al., European Patent Application No. 332,738, Oct. 7, 1988; and Escoudier, J. L. and M. Le Bouar, "Application and Evaluation of Pervaporation for the Production of Low Alcohol Wines," Proceedings of the Third International Conference on Pervaporation Processes in the Chemical Industry, Nancy, France, Sept. 19–22, 1988. As reported by Escoudier et al., water, ethanol, and volatile components were removed from the wine being treated. A relatively hydrophobic membrane more permeable to ethanol than to water was employed to reduce water loss from the beverage. However, volatile components were significantly depleted because the ethanol-selective membrane was also quite permeable to those components. Additional process steps were necessary to trap those volatile compounds, separate them by distillation from ethanol, and return them to the beverage to remedy the degraded quality. The ethanol-selective membrane used was still water-permeable to the extent that 30 to 40% of the native water in the beverage was lost and had to be replaced with process water.

Therefore there remains a great need for a method which provides for the removal of ethanol or other preselected low-molecular-weight organic solutes from aqueous solutions of these solutes—and in particular, from alcoholic beverages, which method can be characterized as follows:

(1) Ethanol should be removed as selectively as possible, i.e. with minimal simultaneous removal of water.
(2) Ethanol should be removed in such a way that addition of water to or removal of water from the product is avoided.
(3) Most organic compounds present in the beverage other than ethanol should be retained in the beverage during ethanol removal to the greatest degree possible.
(4) Product contamination is minimized or eliminated altogether.

2.2 ENRICHMENT OF ALCOHOL AND/OR FLAVOR AND AROMA

Alcoholic beverages are concentrated and enriched for a variety of reasons. For example, Galzy et al., in U.S. Pat. No. 4,610,887, used reverse osmosis to remove water from wines and fermented juices to increase the concentration of the beverage ingredients. Membranes exhibiting good retention of ethanol and other organic compounds with molecular weights below 200 daltons were specified for this process to minimize loss of those organic compounds. In another instance, Bonnome, in U.S. Pat. No. 4,532,140, described the following two-step procedure to prepare an alcohol-enriched, flavored beverage for direct consumption or as a means of reducing the cost of transportation. A portion of water and ethanol from the beverage was first removed by means of reverse osmosis or ultrafiltration to yield a flavor concentrate liquid. The ethanol in the permeate stream was then isolated, by means of a second reverse osmosis stage, and returned to the concentrated flavor liquid. In this process, different membranes are thus required to generate the flavor concentrate liquid and to separate ethanol from water because of the different ethanol permeation/retention properties needed at each step. In cases where reducing transportation cost is the objective, the beverage concentrate would eventually be reconstituted to its original volume by adding water. In yet another process disclosed by Fricker in European Patent No. 116,462, alcoholic beverages were concentrated by combining reverse osmosis and distillation methods. The reverse osmosis portion of this process concentrated the flavor compounds while allowing partial passage of water, ethanol, and some of the volatile flavor components from the beverage into the permeate stream. Alcohol and volatile flavor components were then recovered by distilling the permeate and returned to the beverage concentrate. Again, this procedure is aimed at reducing the volume, and hence the transportation cost, of beverages such as beer, wine, cider, etc. whose principal constituent is water. Frequently, however, concentration or enrichment is performed as an intermediate step in a dealcoholization process. Dikansky et al., in French Patent 2,620,129, described a process which is typical of this approach. An alcoholic beverage was processed by reverse osmosis to remove the water and ethanol as permeate from the other beverage components retained in a substantially reduced volume concentrate. Water was then added to the resultant concentrate of beverage components, while reverse osmosis processing continued, so that the ethanol remaining in the concentrate was gradually removed. Similarly, Kirin Brewery KK and Kurita Water Industries KK, Japan Patent No. 61-119180, described a method for producing a beer concentrate by reverse osmosis, which concentrate was then reconstituted with water to produce a low-alcohol beer.

The processes described above are limited in their ability to produce high quality alcoholic beverage concentrates because they cannot effectively reduce beverage volume via water removal while substantially retaining all of the ethanol and flavor components. In the case of the process described in U.S. Pat. No. 4,610,887, the need to retain as much ethanol as possible in the feed beverage demands the use of a membrane whose ethanol-water selectivity is very high. Unfortunately, few existing membranes are sufficiently retentive toward ethanol to prevent some loss of that alcohol to the permeate stream. This poor selectivity is not surprising considering the similarity in molecular size, polarity, and chemical nature between water and ethanol. Furthermore, rejection generally decreases with increasing ethanol concentration in the feed solution, as mentioned previously, implying that the rate of ethanol loss through the membrane will accelerate as feed or beverage concentration progresses. This typical behavior of reverse osmosis membranes also limits the usefulness of the method described in U.S. Pat. No. 4,532,140, in which the second reverse osmosis stage is relied upon to separate ethanol cleanly from water. As for the method disclosed in EP 116,462, while it is possible to achieve good recovery of ethanol and volatile compounds by distilling the permeate solution obtained from the reverse osmosis step, the application of heat is known to change certain flavor and aroma compounds irreversibly and undesirably. Therefore, there continues to be a need for a method of concentrating alcoholic beverages that is capable of preserving the maximum amount of the original components—and hence character—of the beverage.

While the known processes cited supra utilize reverse osmosis to separate water from ethanol and the flavor compounds, or of separating water and ethanol from the flavor compounds, other membrane processes such as pervaporation may serve similar purposes. In all cases, however, the lack of sufficient membrane selectivity limits the degree of flavor/aroma enrichment possible.

Another significant consequence of the limited ethanol-water selectivity of existing membranes and membrane processing techniques is the hitherto absence of a method of obtaining an alcohol-enriched beverage by way of selectively removing a portion of the water from the beverage while retaining substantially all of the ethanol in the original beverage. "Fortified" wines and other drinks with higher than usual ethanol concentrations are conventionally made by simply adding ethanol or blending with materials of higher alcohol content. The increase in volume actually decreases the concentration of other flavor and aroma components in the beverage, which invariably becomes less intense in character despite its higher alcohol level.

Therefore there remains a need to provide for the removal of water, and other solvents from solutions containing those solvents—and in particular from alcoholic beverages—utilizing a process having the following characteristics:
(1) Water should be removed as selectively as possible, i.e. with minimal simultaneous removal of ethanol.
(2) Water should be removed in such a way that most organic compounds present in the beverage should be retained in the beverage to the greatest extent during water removal.

Still another need which remains unfulfilled involves a process which allows the simultaneous removal of water and ethanol from a beverage, or two preselected volatile components from a solution containing those components—and in particular from alcoholic beverages—which process may be characterized by the following:
(1) Water and ethanol should be removed in any proportion desired, and in particular in the same proportion corresponding to that present in the original beverage.
(2) The water-alcohol mixture should be removed in such a way that most organic compounds present in the beverage are retained in the beverage to the greatest extent during removal of those two components.

3. SUMMARY OF THE INVENTION

Method and apparatus are disclosed for manipulating the ethanol content in alcoholic beverages by selectively removing water, selectively removing ethanol, or by simultaneously removing water and ethanol in any desired proportion. In each case, minor components which contribute to the flavor and aroma of the beverages are substantially retained in the product beverage The apparatus and process of the invention, referred to as vapor-arbitrated pervaporation, is capable of accomplishing the above diverse objectives when carried out under different conditions. Vapor-arbitrated pervaporation is a membrane process in which one side of a semipermeable membrane is in contact with a feed liquid containing one or more volatile substances, and the second side of the membrane is exposed either to a sweep gas stream comprising a non-condensable gas and a regulated quantity of one of the said volatile substances, or to a partial vacuum containing a regulated quantity of one of the said volatile substances. More generally, the invention can be used to adjust the concentration of one or more volatile components in a given solution to any desired level.

In one embodiment of the present invention low-alcohol beverages are produced by a process involving the extraction of ethanol through a semipermeable membrane with the aid of an ethanol-recovery extraction fluid capable of absorbing permeated ethanol as it issues from the membrane while neither absorbing water from the beverage nor contributing additional water to the beverage. Additionally, the nature and properties of the membrane and/or extraction fluid are chosen such that substantially all of the other desirable organic constituents or congeners of the alcoholic beverage are not co-extracted simultaneously with the ethanol to an excessive degree. As a result, organic constituents of the beverage are selectively retained, while the alcohol content of the beverage is selectively reduced. Thus, the finished reduced-alcohol product retains the flavor of the original alcoholic beverage but has an alcohol content that is up to about 97% lower than that of the starting material.

The present invention, in a specific embodiment, relates to a method comprising exposing one side of a membrane to a beverage and the other side of the membrane to a gas-phase extraction fluid, and equalizing the water activities in the beverage and throughout the gas-phase by adjusting the amount, pressure or temperature of the water vapor in the gas-phase extraction fluid. The process of this invention is referred to as vapor-arbitrated pervaporation. The membrane used in this invention should be selectively permeable to ethanol in preference to the flavor, aroma and color components in the beverage. The gas-phase extraction fluid may consist of a non-condensable gas and water vapor above, at or near atmospheric pressure, or it may consist of a partial vacuum and water vapor. The vapor may contain, or have added to it, other organic or inorganic materials. Under the prescribed conditions, ethanol permeates from the beverage across the membrane into the gas-phase. Permeation of the flavor and aroma components is impeded by the membrane. Furthermore, the presence of sufficient water vapor in the gas-phase extraction fluid to provide a water activity approximately equal to that in the beverage inhibits water transport across the membrane, independent of the ethanol/water selectivity of the membrane.

In another embodiment of the present invention, ethanol-enriched beverages are produced by a process involving the extraction of water through a semipermeable membrane in conjunction with a water-recovery extraction fluid capable of absorbing permeated water as it issues from the membrane while neither absorbing ethanol from the beverage nor contributing additional ethanol to the beverage Additionally, the nature and properties of the membrane and/or extraction fluid are chosen such that substantially all of the other desirable organic constituents or congeners of the alcoholic beverage are not co-extracted simultaneously with the water to an excessive degree. As a result, organic constituents of the beverage are selectively retained, while the water content of the beverage is selectively reduced. The finished reduced-water product thus retains the flavor of the original alcoholic beverage, indeed has an enhanced flavor thereover, but has a water content that is up to about 95% lower than that of the starting material. Also, this reduced-water product necessarily has a higher alcohol content than the original feed beverage.

The present invention in a specific embodiment relates to a method comprising exposing one side of a membrane to a beverage and the other side of the membrane to a gas-phase extraction fluid, and equalizing the ethanol activities in the beverage and throughout the gas-phase by adjusting the amount, pressure or temperature of the ethanol vapor in the gas-phase extraction fluid. This related process of the present invention may also be referred to as vapor-arbitrated pervaporation. The membrane used in this invention should be permeable to water selectively over the flavor and aroma components in the beverage. The gas-phase extraction fluid may consist of a non-condensable gas and ethanol vapor above, at or near atmospheric pressure, or it may consist of a partial vacuum and ethanol vapor. The vapor may contain, or have added to it, other organic or inorganic materials. Under the prescribed conditions, water permeates from the beverage across the membrane into the gas-phase. Permeation of the flavor and aroma components is impeded by the membrane. Furthermore, the presence of sufficient ethanol vapor in the gas-phase extraction fluid to provide an ethanol activity approximately equal to that in the beverage inhibits ethanol transport across the membrane, independent of the ethanol/water selectivity of the membrane In yet another embodiment of the present invention a method is disclosed which pertains to the net reduction in the volume of the beverage with no significant change in its alcohol content. This process may be accomplished through the use of membranes, chosen such that they are poorly permeable to many of the desirable organic constituents or congeners of the alcoholic beverage, in conjunction with gas-phase extraction fluids capable of absorbing permeated water and permeated ethanol as they issue from the membrane. Moreover, by introducing ethanol vapor and water vapor into the extraction fluid so that the concentration ratio of ethanol and water complements the inherent selectivity ratio of the membrane, the concurrent removal of water and ethanol from the beverage is realized in exactly the same proportion as that present in the feed beverage. The product then has the same level of alcohol as the original beverage, but is enriched in flavor and aroma components. The gas-phase extraction fluids may consist of a non-condensable gas, ethanol vapor, and water vapor at or near atmospheric pressure, or it may consist of a partial vacuum, ethanol vapor, and water vapor. The methods of this invention offer a means to produce flavor- and aroma-enriched beverages with alcohol contents similar to those of the beverages prior to processing.

Yet another embodiment of the present invention involves a method of manipulating the concentration of at least one preselected member of a plurality of volatile components present in a liquid comprising:

(a) providing a membrane having a feed side and a permeate side opposite said feed side, said membrane being permeable to at least one preselected member of a plurality of volatile components present in a given liquid;

(b) contacting said liquid against said feed side of said membrane;

(c) contacting a gas-phase extraction fluid against said permeate side of said membrane, said extraction fluid comprising a vapor mixture capable of arbitrating the pervaporation of said volatile components such that a portion of said preselected member passes from said feed side of said membrane to said permeate side of said membrane and mixes with said extraction fluid, while a substantial proportion of the remaining members of said plurality of volatile components is retained in said liquid on said feed side of said membrane; and (d) allowing said liquid and said extraction fluid to remain in contact with said feed side and said permeate side of said membrane, respectively, for a period of time sufficient to provide a second liquid on said feed side of said membrane in which the concentration of said preselected member has been manipulated to the desired level.

Yet another embodiment of the present invention involves a method of reducing the concentration of native ethanol in an aqueous liquid comprising:

(a) providing a membrane having a feed side and a permeate side opposite said feed side, said membrane being permeable to ethanol;

(b) contacting said liquid against said feed side of said membrane;

(c) contacting a gas-phase extraction fluid against said permeate side of said membrane, said extraction fluid comprising a water vapor mixture capable of arbitrating the pervaporation of said native water such that a portion of the ethanol present in said liquid passes from said feed side of said membrane to said permeate side of said membrane and mixes with said extraction fluid, while a substantial proportion of said native water is retained in said liquid on said feed side of said membrane; and (d) allowing said liquid and said extraction fluid to remain in contact with said feed side and said permeate side of said membrane, respectively, for a period of time sufficient to provide a second liquid on said feed side of said membrane in which the concentration of said native ethanol has been reduced to the desired level.

Yet another embodiment of the present invention involves a method of enriching the concentration of native ethanol in an aqueous liquid comprising:

(a) providing a membrane having a feed side and a permeate side opposite said feed side, said membrane being permeable to water;

(b) contacting said liquid against said feed side of said membrane;

(c) contacting a gas-phase extraction fluid against said permeate side of said membrane, said extraction fluid comprising an ethanol vapor mixture capable of arbitrating the pervaporation of said native ethanol such that a portion of the water present in said liquid passes from said feed side of said membrane to said permeate side of said membrane and mixes with said extraction fluid, while a substantial proportion of said native ethanol is retained in said liquid on said feed side of said membrane; and (d) allowing said liquid and said extraction fluid to remain in contact with said feed side and said permeate side of said membrane, respectively, for a period of time sufficient to provide a second liquid on said feed side of said membrane in which the concentration of said native ethanol has been enriched to the desired level.

Yet another embodiment of the present invention involves a method of reducing the volume of a liquid comprising at least two volatile solvents, which method comprises:

(a) providing a membrane having a feed side and a permeate side opposite said feed side, said membrane being permeable to at least two volatile solvents;

(b) contacting said liquid against said feed side of said membrane;

(c) contacting a gas-phase extraction fluid against said permeate side of said membrane, said extraction fluid comprising a mixture of said volatile solvents such that a portion of the corresponding solvents which are native to said liquid passes from said feed side of said membrane to said permeate side of said membrane at a preselected flux ratio and mixes with said extraction fluid, such that the resultant volume-reduced liquid contains the desired proportion of said native volatile solvents; and (d) allowing said liquid and said extraction fluid to remain in contact with said feed side and said permeate side of said membrane, respectively, for a period of time sufficient to provide a second liquid on said feed side of said membrane having a volume which has been reduced to the desired level.

Yet another embodiment of the present invention involves a method of reducing the volume of a liquid while substantially maintaining the initial proportion of native ethanol and water in the liquid comprising:

(a) providing a membrane having a feed side and a permeate side opposite said feed side, said membrane being permeable to ethanol and water;

(b) contacting said liquid against said feed side of said membrane;

(c) contacting a gas-phase extraction fluid against said permeate side of said membrane, said extraction fluid comprising a mixture of ethanol and water vapor in a predetermined ratio capable of arbitrating the pervaporation of said native ethanol and water such that a portion of said native ethanol and water present in said liquid passes from said feed side of said membrane to said permeate side of said membrane, at an ethanol flux to water flux ratio corresponding to the molar ratio of ethanol to water in said liquid, and mixes with said extraction fluid, while the proportion of said native ethanol and water retained in said liquid on said feed side of said membrane corresponds substantially to the initial proportion present in said liquid; and (d) allowing said liquid and said extraction fluid to remain in contact with said feed side and said permeate side of said membrane, respectively, for a period of time sufficient to provide a second liquid on said feed side of said membrane having a volume which has been reduced to the desired level.

Yet another embodiment of the present invention involves a vapor-arbitrated pervaporation method of selectively reducing the amount of a first volatile component in a fluid mixture having at least two volatile components independent of the permselectivity of a membrane utilized in said method against one or the other of said volatile components comprising:

(a) providing a membrane having a feed side and a permeate side, said membrane being permeable to at least a first volatile component;

(b) contacting a fluid mixture containing said first volatile component and at least a second volatile component against said feed side of said membrane;

(c) contacting a gas-phase extraction fluid against said permeate side of said membrane, said extraction fluid comprising a mixture of a carrier gas and a sufficient amount of the vapor of said second volatile component such that a portion of said first volatile component passes from the feed side of said membrane to the permeate side of said membrane and mixes with said extraction fluid, while a substantial portion of said second volatile component is retained on the feed side of said membrane; and (d) allowing said fluid mixture and said extraction fluid to remain in contact with the feed and permeate sides of said membrane, respectively, for a period of time sufficient to reduce the amount of said first volatile component in said fluid mixture to the desired level. In this particular embodiment the carrier gas is a non-condensable gas; i.e., one which does not condense to a significant degree under conditions which are sufficient to condense the volatile components of interest in said fluid mixture.

Yet another embodiment of the present invention involves an apparatus for manipulating the concentration of at least one preselected member of a plurality of volatile components present in a liquid comprising:

(a) a membrane having a feed side and a permeate said feed side, said membrane being permeable to at least one preselected member of a plurality of volatile components present in a given liquid;

(b) means for introducing said liquid against said feed side of said membrane;

(c) means for providing a gas-phase extraction fluid to said permeate side of said membrane, said extraction fluid comprising a vapor mixture capable of arbitrating the pervaporation of said volatile components such that a portion of said preselected member passes from said feed side of said membrane to said permeate side of said membrane and mixes with said extraction fluid, while a substantial proportion of the remaining members of said plurality of volatile components is retained in said liquid on said feed side of said membrane; and (d) means for regulating the composition, flow, temperature or pressure of said extraction fluid; and (e) optional means for processing and recycling said extraction fluid, such that a second liquid on said feed side of said membrane is provided in which the concentration of said preselected member has been manipulated to the desired level.

Other embodiments of the present invention will be apparent to those skilled in the art based upon the disclosure present herein. These and other like embodiments are considered to be within the scope and spirit of the present invention.

4. BRIEF DESCRIPTION OF THE FIGURES

The present invention may be more readily understood by reference to the following figures in which FIG. 1 is a schematic representation of the principles of the vapor-arbitrated pervaporation process of the present invention during which a liquid present on one side of a membrane in a liquid phase contains at least two volatile components A and B, and on the other side of membrane an extraction fluid, comprising a non-condensable gas and a controlled amount of the vapor of component B, is present such that a potential for the net transport of component A from the liquid phase to the vapor phase is obtained, while the potential for the net transport of component B from the liquid phase to the vapor phase is virtually eliminated. The liquid phase may be an alcoholic beverage.

5. DETAILED DESCRIPTION OF THE INVENTION

The present invention pertains to the controlled manipulation of ethanol content in alcoholic beverages while simultaneously preserving the flavor and aroma contents originally present in the beverage. Such manipulation includes 1) selective removal of ethanol; 2) selective removal of water; and 3) selective removal of ethanol and water at a preselected proportion. These manipulations are available in a class of membrane processes referred to as vapor-arbitrated pervaporation. Each of the problems identified supra with existing technologies has been addressed and overcome by the processes described herein.

Figure 1:
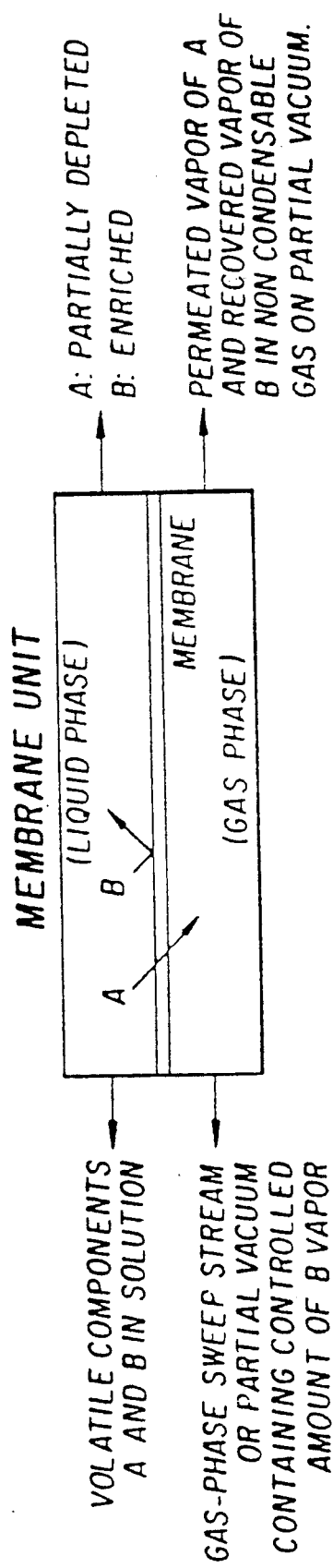

More generally, the present invention pertains to the separation of two volatile components A and B present in a liquid phase by selectively removing one of those components, say A, through a membrane into a gas phase while substantially retaining the other component, B, in the liquid phase. As a result, the liquid phase becomes partially depleted in component A. To the extent that removing A causes a decrease in the volume of the liquid phase, the concentration of the retained component B is increased, i.e. enriched, in the liquid phase. The present invention provides for equalizing the permeate-side activity of component B and the feed-side activity of component B in the liquid phase. In so doing, the driving force for diffusional transport of B is diminished, and the need for replenishing component B at the end of the process is averted. This concept is illustrated in FIG. 1.

It should be noted that the terms "equalization" and "equalize" as used herein to describe the relationship of activities of a given volatile component on opposite sides of the membrane is meant to describe four cases: (i) where the activities of a volatile component on opposite sides of the membrane are precisely identical; (ii) where the activities of a volatile component on opposite sides of the membrane are approximately the same—i.e., not precisely equal, but roughly in balance; (iii) where the activities of a volatile component on opposite sides of the membrane are not everywhere equal, but where the deviations from equality of activities of that volatile component which exist at different points along the membrane surface are largely compensatory (i.e., positive deviations being compensated for by negative deviations) with the result that there is little or no overall flux of that volatile component into or from the liquid being treated; and (iv) where the activities of a first volatile component on opposite sides of the membrane are not equal at all times during the process of removing a second volatile component, but where the deviations from equality of activities of the first volatile component that exist at different times are largely compensatory with the result that there is no overall flux of the first component into or from the liquid being treated.

As these principles are applied to the treatment of alcoholic beverages, where water and ethanol may correspond interchangeably to the volatile components A and B referred to supra, it is the quality of the treated beverage that is the ultimate determinant of how closely the ideal of perfect equality of transmembrane activities of water or ethanol must be approached in the practice of the process of this invention.

In order that there be no transport of one of the volatile components across the membrane, the activities of that component in the liquid and gas-phase extraction fluid should be equivalent or balanced. In other words, there should be no driving force for, say, water in one direction or the other. For this balance to be achieved, the chemical potential of water in the liquid and gas-phase extraction fluid should be equivalent. (Smith, J. M. and H. C. Van Ness, *Introduction to Chemical Engineering Thermodynamics*, 4th ed., McGraw Hill, 1987). The chemical potential of component i may be defined as:

$$\mu_i = RT \ln f_i + \phi(T) \tag{1}$$

where, R is the universal gas constant (82.06 mL-atm/°K.-mol), T is temperature (°K.), fi is the fugacity of species i and $\phi(T)$ is a constant. The fugacity of a substance may be defined as the tendency of a substance in the liquid phase to escape into the gaseous phase and vice versa. From equation (1), it follows that at a given temperature, the fugacity of component i in the liquid phase, $f_{i,l}$ should equal the fugacity of component i in the gas phase, $f_{i,g}$. Thus:

$$f_{i,1} = \gamma_i x_i f_i = f_{i,g} = y_i \phi_i P \tag{2}$$

where, $\gamma_i$ = activity coefficient of i in the liquid
$f_i$ = standard state fugacity of pure liquid i
$x_i$ = mole fraction of i in the liquid phase
$y_i$ = mole fraction of i in the vapor phase
$\phi_i$ = fugacity of saturated liquid or vapor i, and
P = total pressure.

It should be noted that the activity of a substance in the gases or liquid phase is the ratio of the fugacity of the substance at a given temperature T to the fugacity of the substance in the standard state. Therefore, if the fugacity of component i in its liquid and gaseous states are equivalent, then it follows that the activities are also equivalent.

It can be shown that:

$$f_i = \phi_{i,sat} P_{i,sat} \exp[V_{i,1}(P - P_{i,sat})/RT] \tag{3}$$

where, $\phi_{i,sat}$ = fugacity of saturated liquid or vapor i
$P_{i,sat}$ = saturation pressure of component i at temperature T, and
$V_{i,1}$ = molar volume of liquid component i.

At low pressures, the vapor phase behaves as an ideal gas for which $$\phi_i = \phi_{i,sat} = 1 \tag{4}$$

and the Poynting factor represented by the exponential term in equation (3) is close to unity. Thus equation (2) simplifies to $$\gamma_i x_i P_{i,sat} y_i P \tag{5}$$

or $$y_i = \gamma_i x_i P_{i,sat}/P \tag{6}$$

The activity coefficient, $\gamma_i$, can be obtained from experimental measurements of partial pressures of component i over a mixture of volatile liquid components. If $x_i$ and P are fixed, then $y_i$, the mole fraction of component i in the gas stream required to balance its chemical potential in the liquid (or to have zero component i transport across the membrane) can be found from Equation (6).

For the manipulation of ethanol concentration in alcoholic beverages, two working relationships can be developed. To achieve alcohol reduction, it is necessary to equalize water activities on both sides of the membrane. The relationship between the relative humidity in the gas-phase and the mole fraction of water in the beverage at a given temperature is:

$$Relative\ humidity\ (\%) = (y_w P/P_{w,sat}) \times 100. \qquad (7)$$

Similarly, for the purpose of balancing the ethanol activities across the membrane during alcohol enrichment, a saturation ratio term may be defined as the ratio of ethanol partial pressure to the vapor pressure of ethanol at that temperature:

$$Ethanol\ saturation\ ratio = (y_e P/P_{e,sat}) \qquad (8)$$

The subscripts w and e in Equations (7) and (8) indicate water and ethanol respectively.

Figure 2:
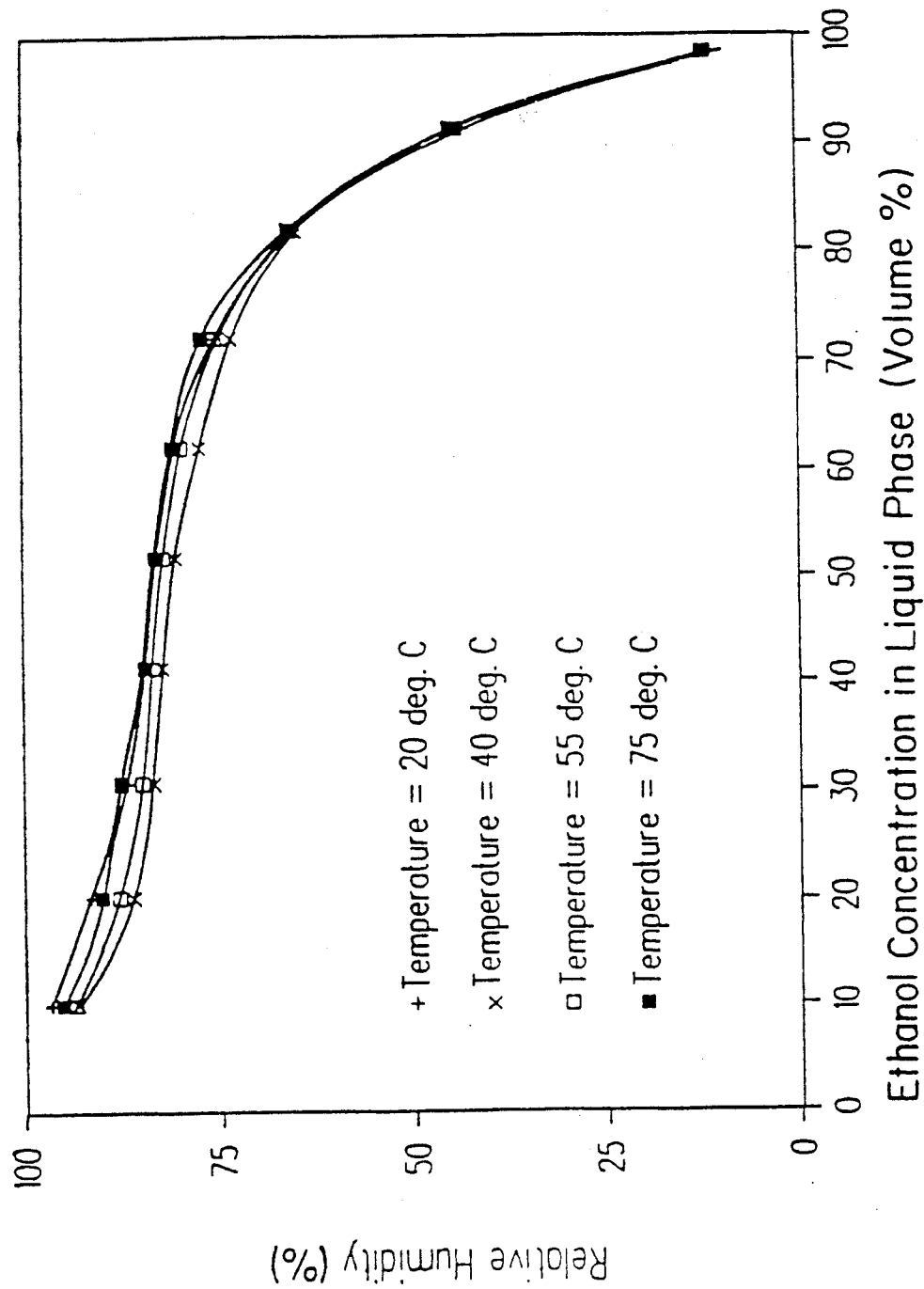
FIG. 2 shows a plot of the relative humidity required to prevent water transport across the membrane as a function of ethanol concentration (in volume %) in the liquid phase.
Figure 3:
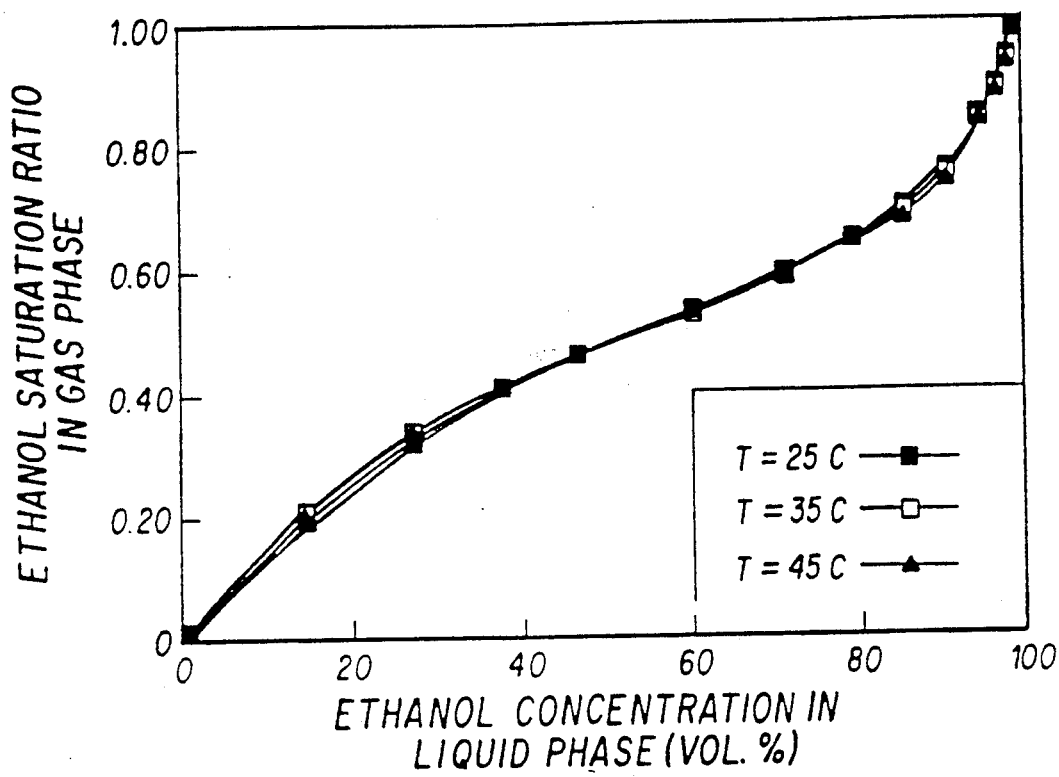
FIG. 3 shows a plot of ethanol saturation ratio in the vapor stream required to balance the activity of ethanol in the beverage, as a function of the concentration of ethanol (volume %) in the liquid phase.

The partial pressures of water and ethanol at various temperatures and compositions are shown in Table I. From these experimental data and the equations supra, the relative humidity required for operating vapor-arbitrated pervaporation in the alcohol reduction mode without water loss has been calculated as a function of beverage alcohol content as shown in FIG. 2. For example, the relative humidity required to prevent water transport across the membrane from a 40 vol % alcohol beverage is about 85% at ambient temperature and pressure. Similarly, the relative ethanol pressure required for operating vapor-arbitrated pervaporation in the alcohol enrichment mode without ethanol loss is shown in FIG. 3. Beverage ethanol contents are shown in these figures in vol %, the common units employed in the labeling of alcoholic beverages.

TABLE I

Partial Pressure of Water/Ethanol Mixtures as a Function of Temperature and Composition

| Ethanol (wt. %) | Temperature (° C.) | | | | | | | |
|---|---|---|---|---|---|---|---|---|
| | 20 | | 40 | | 55 | | 77 | |
| | $P_w$ | $P_e$ | $P_w$ | $P_e$ | $P_w$ | $P_e$ | $P_w$ | $P_e$ |
| 0 | 17.5 | 0.0 | 54.3 | 0.0 | 117.0 | 0.0 | 287.0 | 0.0 |
| 10 | 16.8 | 6.7 | 51.6 | 26.9 | 110.7 | 59.3 | 276.0 | 144.0 |
| 20 | 15.9 | 12.6 | 47.6 | 43.5 | 104.0 | 94.4 | 261.0 | 218.8 |
| 30 | 15.1 | 17.1 | 46.2 | 54.7 | 100.5 | 114.8 | 254.0 | 269.2 |
| 40 | 14.7 | 20.7 | 45.5 | 62.5 | 98.9 | 130.8 | 245.0 | 305.0 |
| 50 | 14.5 | 23.5 | 44.6 | 68.3 | 97.3 | 142.6 | 241.0 | 336.0 |
| 60 | 14.1 | 25.6 | 42.9 | 74.8 | 94.4 | 155.6 | 235.0 | 365.0 |
| 70 | 13.1 | 28.0 | 40.5 | 82.8 | 89.1 | 172.6 | 224.0 | 405.0 |
| 80 | 11.3 | 31.2 | 35.9 | 91.8 | 77.6 | 192.8 | 191.4 | 454.0 |
| 90 | 7.5 | 35.8 | 24.7 | 106.4 | 52.5 | 223.9 | 130.3 | 527.0 |
| 98 | 1.9 | 42.3 | 6.5 | 123.0 | 14.3 | 262.4 | 34.7 | 625.0 |
| 100 | 0.0 | 43.6 | 0.0 | 134.0 | 0.0 | 283.0 | 0.0 | 667.0 |

$P_w$ and $P_e$ are in units of mm Hg.

5. ALCOHOL REDUCTION

Figure 4:
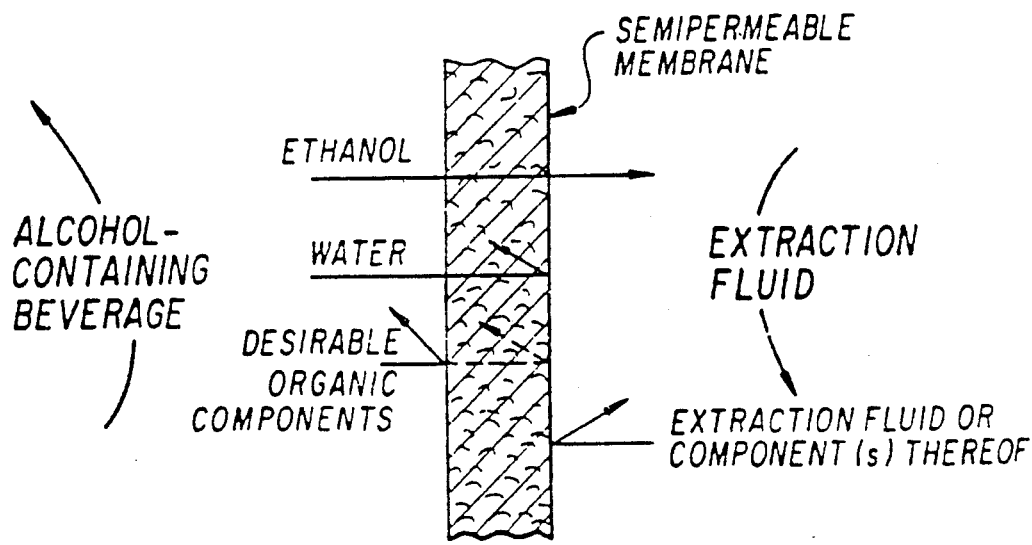
FIG. 4 is a schematic representation of the basic membrane extraction alcohol reduction process, wherein an alcohol-containing beverage and an extraction fluid move, optionally but preferably in countercurrent fashion, on opposite sides of a permselective membrane, so that only ethanol permeates into the extraction fluid.

Removal of ethanol by extraction in general is illustrated in FIG. 4. As shown, a semipermeable membrane is interposed at the interface between the alcoholic beverage that is to be processed and an appropriate gaseous extraction fluid. Certain desirable organic components or congeners of the beverage are unable to pass through the permselective membrane and into the extraction fluid; additionally, the extraction fluid itself may exhibit a degree of selectivity for the preferential volatilization of ethanol over the other, desirable organic components. In this manner, preferential removal of ethanol over other desirable organic solutes in the beverage is realized.

A second aspect of the invention is its ability to selectively remove ethanol in preference to water. A distinguishing feature of this invention is that the membrane need not be selectively permeable to ethanol over water. Indeed, the overall process can exhibit remarkable ethanol removal selectivity, even when water would normally be capable of freely permeating the membrane along with ethanol. This performance results from the characteristics of the extraction fluid. In particular, the extraction fluid is chosen such that it does not absorb permeated water from the wine or other alcoholic beverage being treated, nor does the extraction fluid donate water to the alcoholic beverage.

The present invention provides a method for producing from a first alcoholic beverage a second beverage of reduced alcoholic content comprising the steps:

providing a membrane which is alcohol permeable;
feeding a first alcoholic beverage
across a feed side of said membrane;
feeding a gas-phase extraction fluid across a permeate side of said membrane, said extraction fluid being alcohol absorbing, but substantially not water absorbing and said extraction fluid comprising water vapor in an amount sufficient to minimize the diffusion of water from said first alcoholic beverage to said permeate side of said membrane by balancing the activity of water on said feed side of said membrane so as to evaporate into said gas-phase extraction fluid the portion of the alcohol initially present in said first alcoholic beverage which has crossed to the permeate side of said membrane, thereby forming from said first alcoholic beverage a second beverage having reduced alcoholic content; and
withdrawing said gas-phase extraction fluid containing water vapor and alcohol from said permeate side of said membrane, whereby said second beverage having reduced alcoholic content is produced on said feed side of said membrane.

Figure 5:
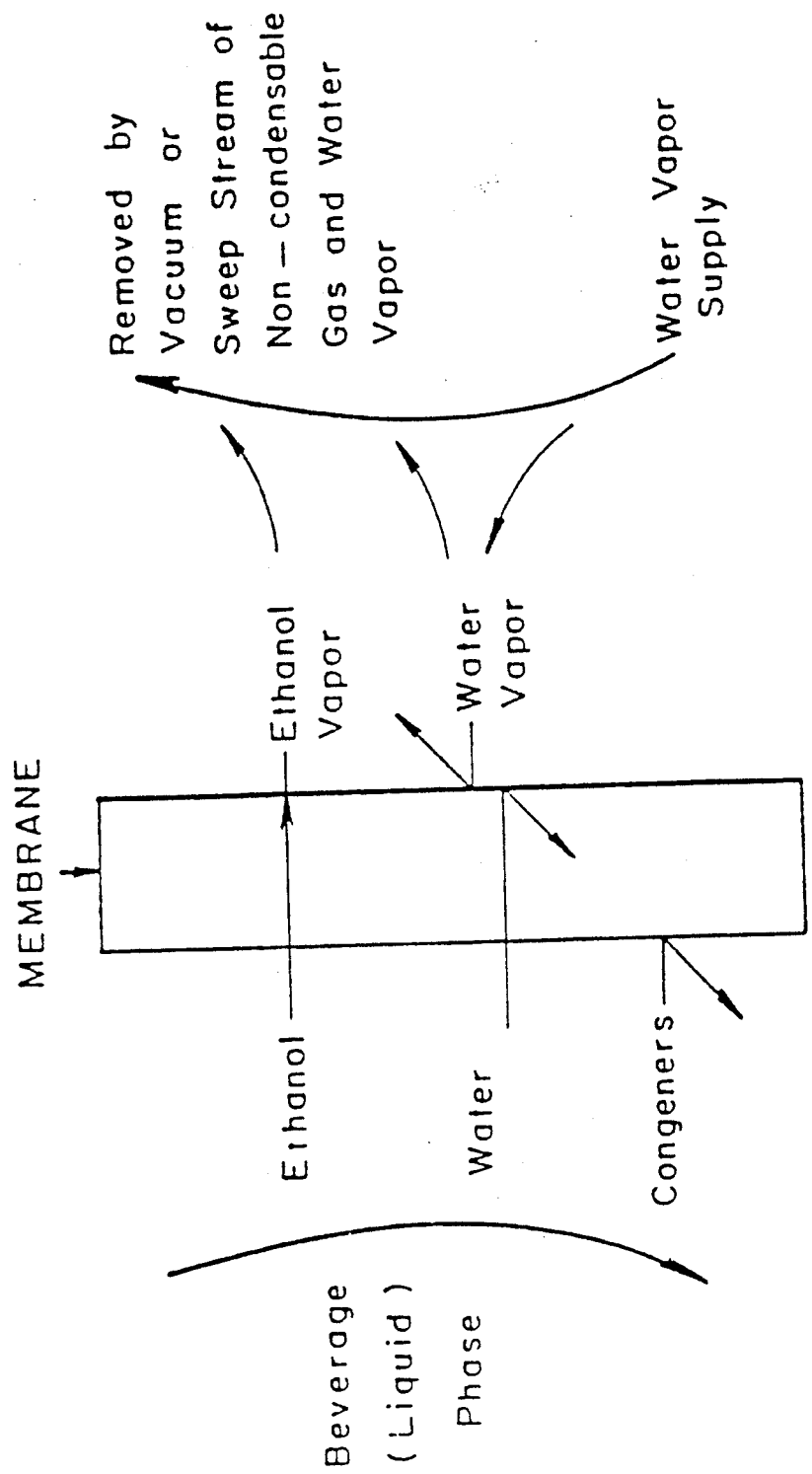
FIG. 5 is a schematic representation of the basic vapor-arbitrated pervaporation process for the removal of ethanol from alcoholic beverages wherein the water activity is equalized in the liquid phase and gaseous phase by addition of water vapor to the gaseous phase.

The features of the process are depicted conceptually in FIG. 5. The use of a membrane that is more permeable to ethanol than to the congeners ensures that most of the congeners will be retained in the beverage during ethanol removal. The gas-phase extraction fluid may be maintained in the gas-phase using either a non-condensable gas (e.g. air or nitrogen) or vacuum applied from a vacuum pump. The gas-phase extraction fluid further comprises water vapor to balance the water activities on the permeate and feed sides of the membrane, as will be discussed infra.

The gas-phase extraction fluid may also comprise organic or inorganic components so as to prevent the permeation of such components present in the beverage across the membrane. These components may be naturally in the extraction fluid or they may be added selectively hereto. Although the present invention is primarily intended for ethanol removal from beverages, the process concept described herein can be applied generically to the selective removal of one or more volatile components from aqueous solutions while retaining other dissolved volatile and non-volatile components.

Commercially available alcoholic beverages which include but are not limited to beer, wine, and distilled spirits, have an initial ethanol content of from about 5 to about 75 volume %. Correspondingly, referring to FIG. 2, the relative humidity should be maintained at about 60 to about 95% at about 5° C. to about 75° C. Specifically, if the alcoholic beverage is a beer with an initial ethanol content of from about 5 to about 10% by volume, the relative humidity should be maintained at about 95% to about 100% at about 5° C. to about 75° C. If the alcoholic beverage is a wine with an initial ethanol content from about 9 to about 13% volume, the relative humidity should be maintained at about 85 to 95% at about 5° to about 75° C. If the alcoholic beverage is a brandy with an initial ethanol content from about 35 to about 55 volume %, the relative humidity should be maintained at about 80 to 90% at about 20° to about 75° C. If the alcoholic beverage is a distilled spirit with an initial ethanol content from about 50 to about 70 volume %, the relative humidity should be maintained at about 75 to about 85% at about 20° C. to about 75° C. In some cases, processing temperatures below about 20° C. or above about 75° C. may be desirable. The same principle of relative humidity adjustment applies generally at those other temperatures.

The alcoholic beverage may be processed at or near atmospheric pressure. For beers or sparkling wines, however, a slightly higher pressure may also be applied such that the carbon dioxide dissolved in those beverages is preserved during alcohol reduction treatment. The principle of vapor-arbitrated pervaporation remains generally applicable at those other pressures.

A variety of process schemes are possible for equalizing feed- and permeate-side water activities in vapor-arbitrated pervaporation.

The invention also relates to an apparatus for producing from a first alcoholic beverage a second beverage of reduced alcoholic content comprising
 a membrane which is alcohol permeable;
 means for feeding a first alcoholic beverage across a feed side of said membrane; and
 means for providing a gas-phase extraction fluid to a permeate side of said membrane;
 means for regulating the relative humidity of said gas-phase extraction fluid on said permeate side of said membrane; and
 whereby alcohol diffuses from the first beverage through the membrane into said gas-phase extraction fluid to produce said second beverage on said feed side of said membrane having reduced alcohol content and a gas-phase extraction fluid comprising water vapor and alcohol on said permeate side of said membrane. Particular embodiments of the technology are described infra. It is assumed in all cases that relatively polar, hydrophilic membranes with good ethanol/congener selectivity are used.

Although the present invention is primarily intended for ethanol removal from beverages, the concept described herein can be applied generically to the selective removal of one or more volatile components from aqueous solutions while retaining other dissolved components.

5 1.1 VAPOR-SWEPT SYSTEMS

Figure 6:
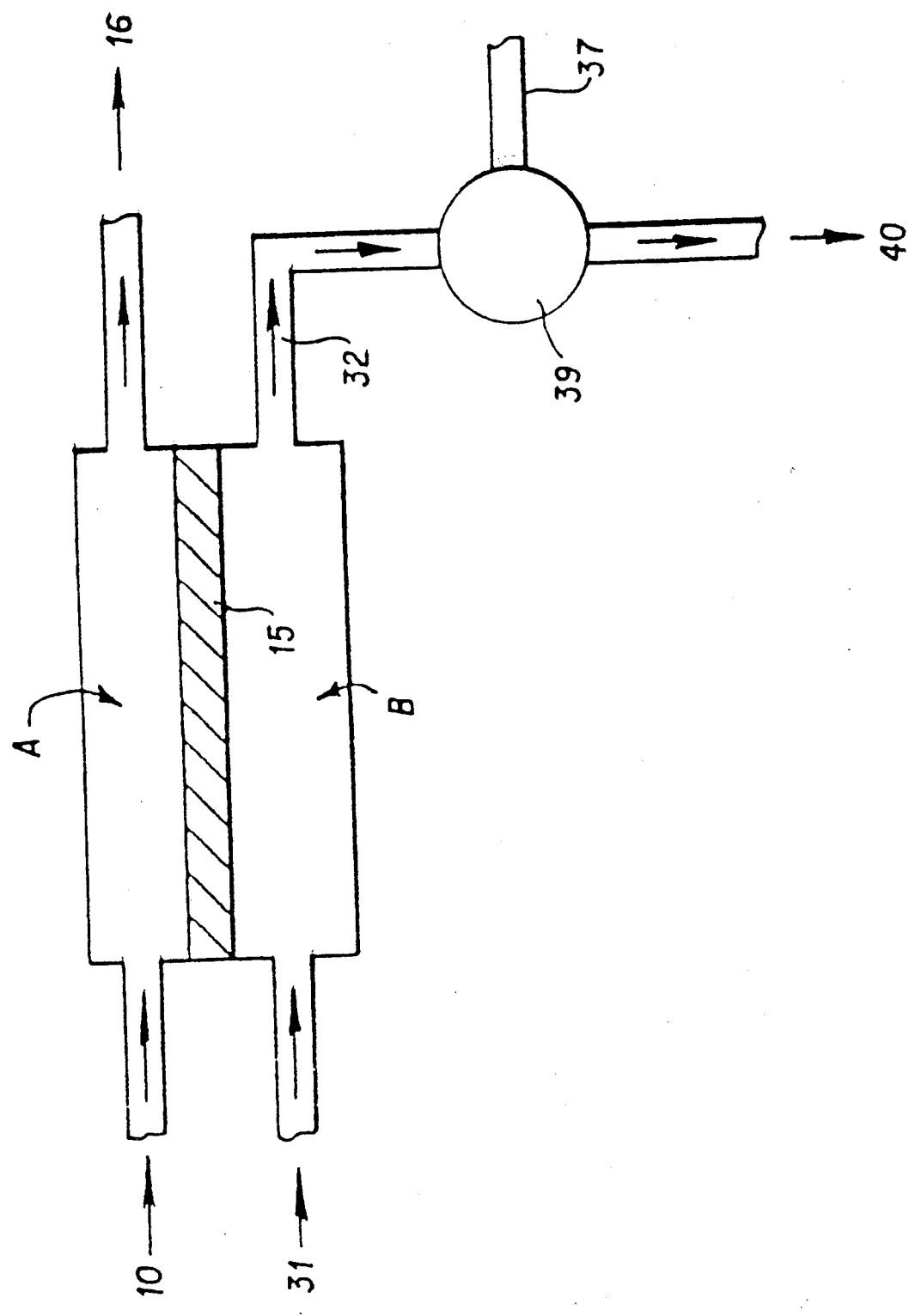
FIG. 6 is a schematic representation of a vapor-arbitrated pervaporation process with feed- and permeate-side water activity equalization and ethanol recovery.

A preferred vapor-swept pervaporation system embodying the water activity management concept is shown conceptually in FIG. 6. A membrane unit comprises two flow compartments, one on each side of the membrane 15. Beverage 10 is fed to compartment A of the membrane unit, a gas-phase extraction fluid 31 comprising a mixture of non-condensable gas (such as air or nitrogen) and water vapor is fed to the other compartment B as a sweep stream. A feed subsystem regulates the delivery rate and the temperature of the beverage; it also replenishes the latent heat of evaporation lost from the feed stream during ethanol pervaporation. A humidification subsystem is used to regulate the temperature, relative humidity (and thus water activity), and flow rate of the sweep stream. The beverage emerges with a reduced alcoholic content 16. An alcohol recovery subsystem 39 separates the water and ethanol 40 from the non-condensable gas 37 in the gas-phase extraction fluid that emerges 32. Provided that the sweep stream flow rate is sufficiently high to prevent excess ethanol accumulation on the permeate side of the membrane, the pervaporation and purging actions will continue to sustain ethanol reduction. Another function of the sweep stream is to help supply part of the latent heat of ethanol evaporation.

Figure 7:
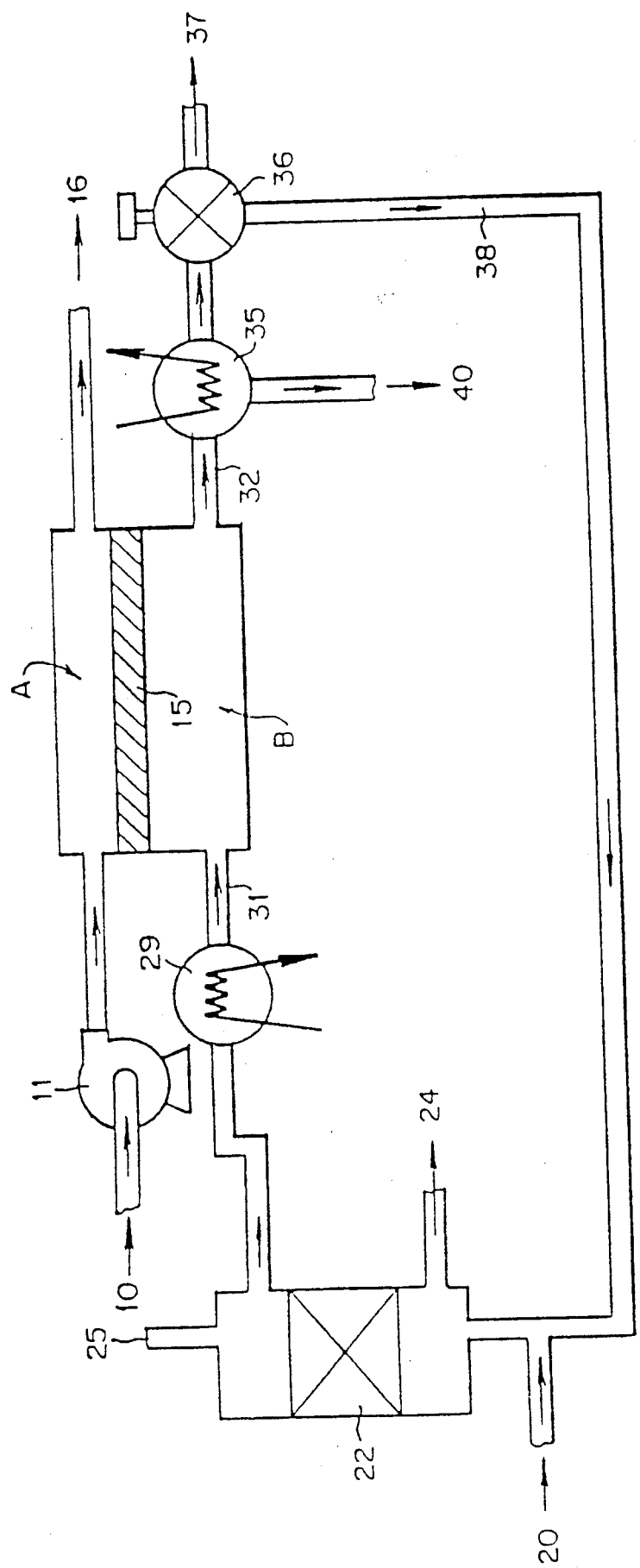
FIG. 7 shows a schematic representation of a process whereby liquid water entering a gas-liquid contactor is vaporized and blended with a non-condensable gas. Ethanol is recovered by using a condenser.

Another preferred embodiment of the humidification subsystem is shown in FIG. 7. The beverage 10 is circulated via a pump 11 to compartment A of the membrane unit containing membrane 15. The beverage emerges with a reduced alcoholic content 16. Liquid water 25 is vaporized with the non-condensable gas 20 in a gas/liquid contactor 22 (e.g. a spray tower, packed column, etc.). Excess water may be removed via an outlet 24. The temperature $T_s$ inside the contactor 22 (approximately equal to that of the incoming water) is set to produce a water loading of the gas which, upon heating with a process heater 29 to the operating temperature T of the resulting gas-phase extraction fluid 31, will give exactly the desired relative humidity. The process heater may be for example a steam or electrical heater, a heat exchanger, or some other heat source operated at a temperature sufficiently high to give the desired relative humidity. The gas-phase extraction fluid that emerges from compartment B of the membrane unit, comprising noncondensable gas, water vapor, ethanol vapor, and other volatile organic components (e.g. congeners) 32 may be cooled with a condenser 35 and the liquified ethanol solution 40 may be collected. The non-condensable gas, stripped of water and ethanol vapors, can be vented 37 via a valve 36 or recycled 38 to the humidification system. Recycling is desirable in some cases. For example, nitrogen may be used as the non-condensable gas for the purpose of minimizing oxidation of the beverage; but disposal of the gas after a single pass through the membrane unit would be uneconomical. Another reason for recycling is to allow certain permeated congeners to accumulate in the gas stream so as to deter further loss of those congeners from the beverage. Optionally, the temperature and flow rate of the incoming non-condensable gas stream may be adjusted so that the gas does not become saturated with water vapor in the liquid-gas contactor, rather, the exiting gas stream would have the required temperature and relative humidity with no further heating or cooling.

Figure 8:
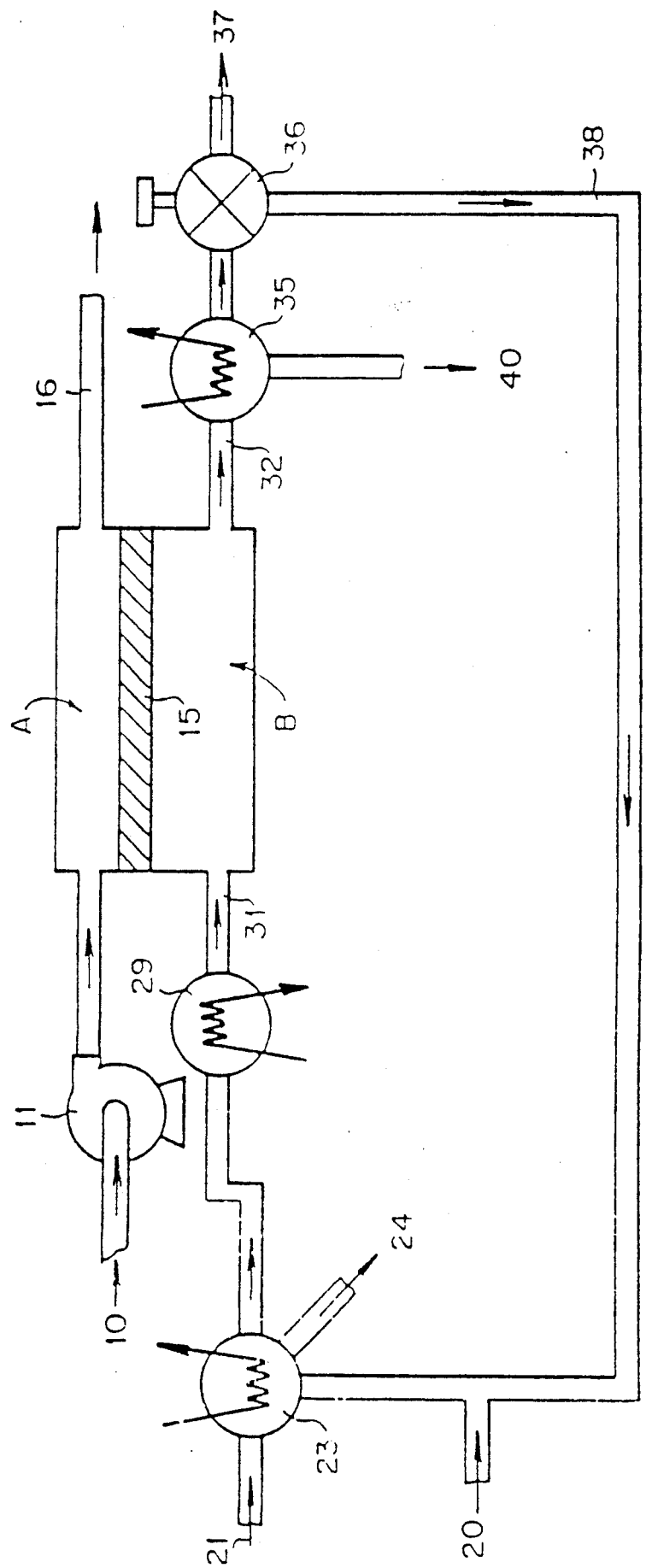
FIG. 8 shows a schematic representation of a process whereby steam is mixed with the non-condensable gas in a condenser to produce a humidified exit gas stream. Ethanol is recovered with a condenser.

A particularly preferred embodiment is shown in FIG. 8. As in FIG. 7, the beverage 10 is circulated via a pump 11 to compartment A of the membrane unit containing membrane 15. The beverage emerges with a reduced alcoholic content 16. Steam 21 is mixed with the non-condensable gas 20 in a condenser 23 to produce a water-saturated gas-phase extraction fluid at a temperature Ts. Excess water condensed from the steam 24 is removed from the condenser 23. Again, the gas-phase extraction fluid is heated to a preselected operating temperature with a process heater 29 to produce a gas-phase extraction fluid having the desired relative humidity. Alternatively, direct injection of steam at a precisely controlled rate into a pre-conditioned air stream is an even more preferable means of generating the desired humidified air sweep stream in a single step. The condenser 23 in this case would function as an optional mixing chamber for air and steam and the reheater 29 would be used as a trim heater or trim cooler for optional final adjustment of vapor stream temperature. As described for FIG. 7, the gas-phase extraction fluid that emerges 32 from compartment B of the membrane may be cooled with a condenser 35 and the liquified ethanol solution 40 may be collected. The non-condensable gas may be vented 37 via a valve 36 or recycled 38 to the humidification system.

Figure 10:
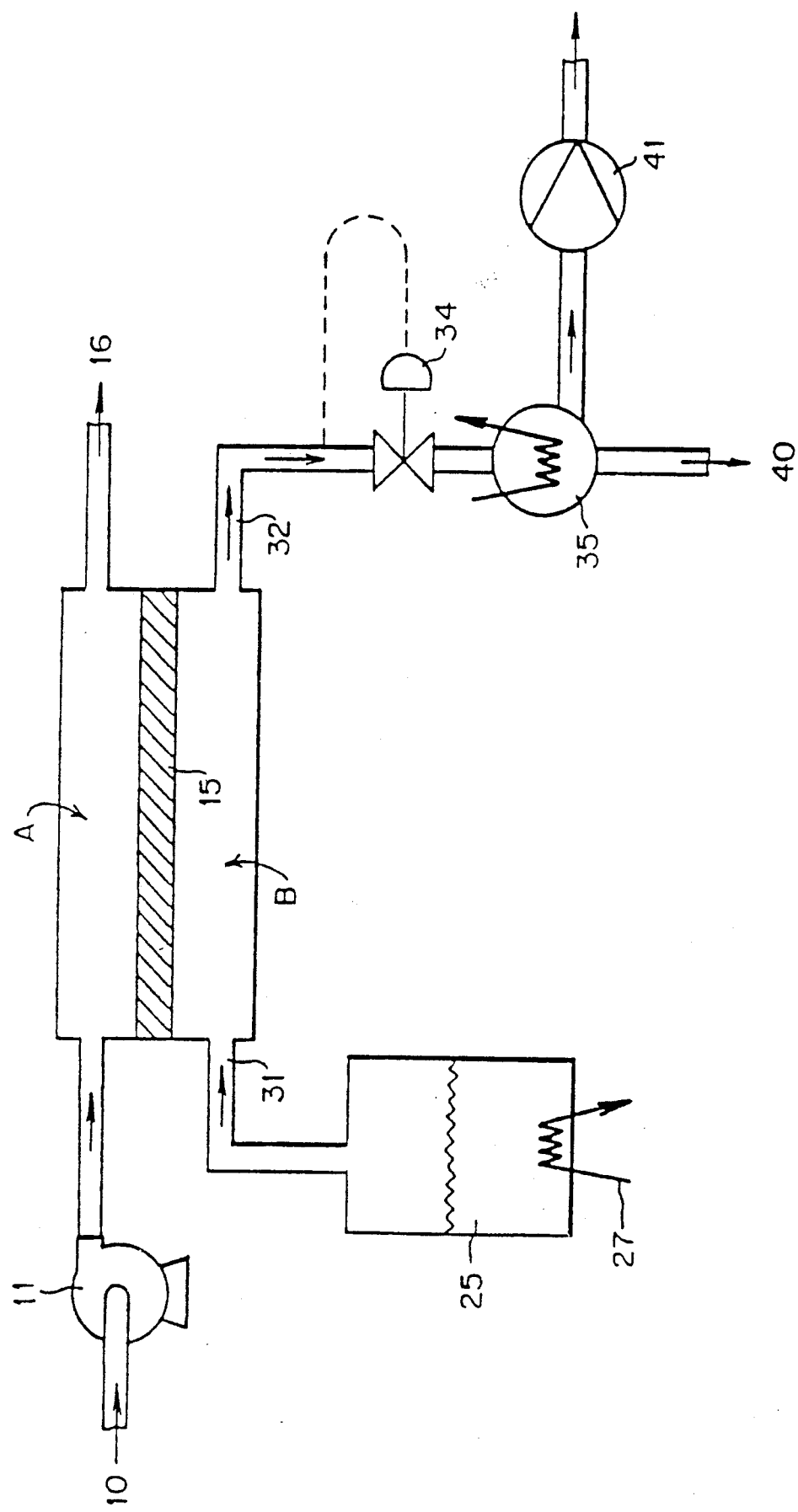
FIG. 10 is a schematic representation of a prevaporation system with permeate removal by vacuum and permeate-side water activity control.

In another preferred embodiment, as shown in FIG. 10, the alcoholic beverage 10 is circulated with a pump 11 to compartment A of the membrane unit containing membrane 15. A process heater 12 may be used to maintain the feed stream at an operating temperature T. A flowmeter 13 may be used to monitor the flow rate of the beverage stream. The gas-phase extraction fluid 31, supplied to compartment B of the membrane unit, may be produced by pumping air 20 through a separate column 22 where it contacts water 25 heated with a process heater 27 at a temperature $T_s$ to reach saturation. A flowmeter 21 may be used to monitor the flow rate of the air, 20. A pump 26 may be used to control the flow rate of the water. Excess water may be removed via an outlet 24. The saturated gas phase extraction fluid 28 may then be reheated with a process heater 29 to the operating temperature T to attain a relative humidity governed by the temperature rise $(T-T_s)$. $T_s$ may be determined from a given T and the required relative humidity by using the procedure described in Section 5.1, Table I and FIG. 2. Equalizing the temperature of the feed and sweep streams, although optional, may help maintain a uniform relative humidity along the permeate side of the membrane by reducing transmembrane heat transfer beyond that associated with pervaporation of ethanol. The apparatus may be equipped with an automatic humidity control system that monitors the relative humidity of the gas-phase extraction fluid 31 at the entrance to the membrane module, and adjusts the saturation temperature $T_s$ to compensate for deviations from the relative humidity set point. The gas-phase extraction fluid 32 exiting from the membrane module is sent to a condenser 35 where water and the pervaporated ethanol 40 are liquified and collected. A thin-film composite membrane comprising an interfacially crosslinked polyurea membrane supported by an asymmetric, microporous polysulfone substrate is preferred. Such a membrane is described further in Section 5.5, infra.

5.1.2 VACUUM SYSTEMS

Figure 11:
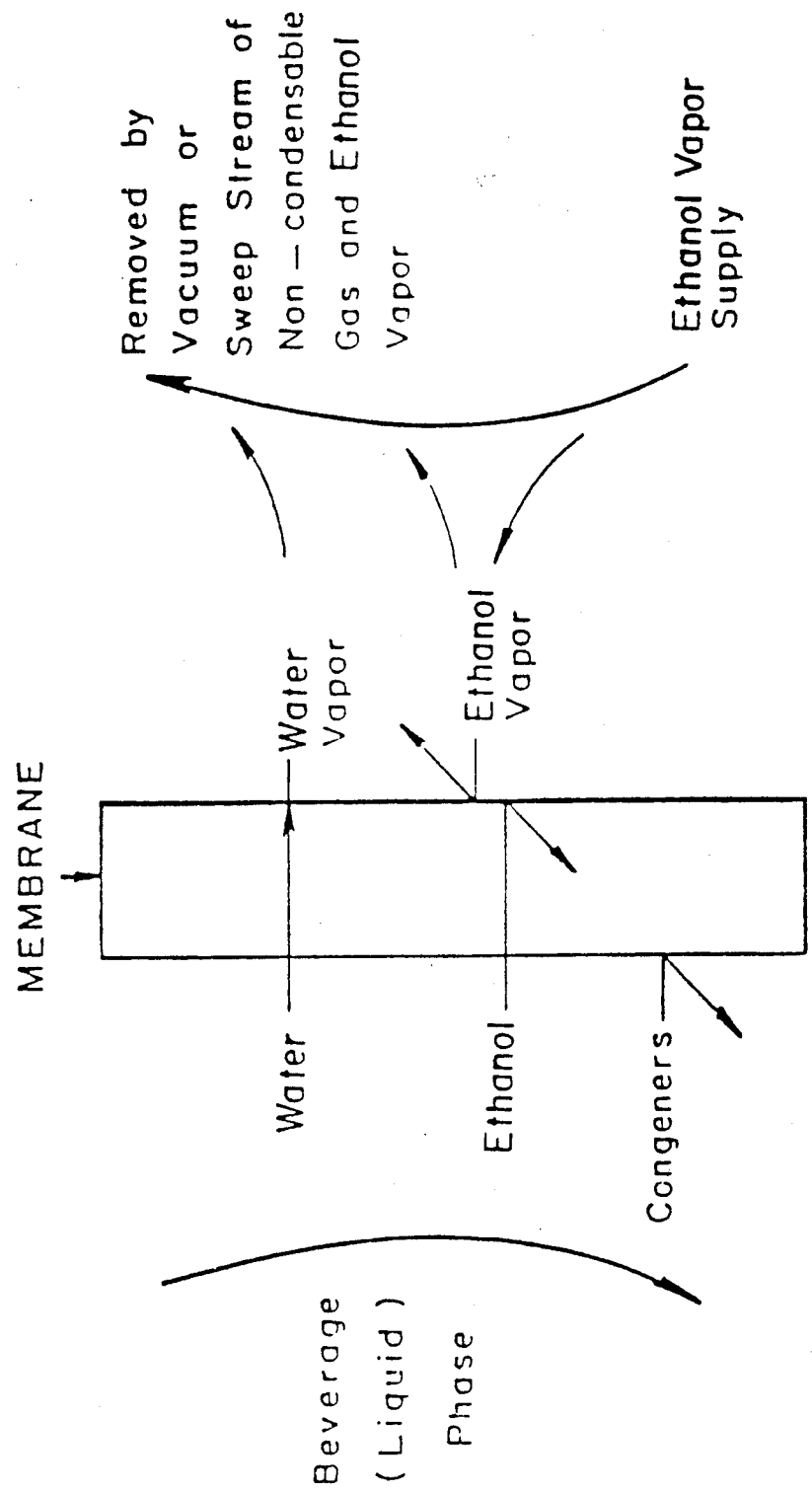
FIG. 11 illustrates the basic vapor-arbitrated pervaporation process for alcohol enrichment.

A pervaporation system embodying the water-activity equalization concept but which uses vacuum to remove the permeate is depicted in FIG. 11. Beverage 10 is fed into compartment A of the membrane unit containing membrane 15 via a pump 11 to produce a beverage of reduced alcoholic content 16. The inlet to the permeate side of the membrane unit is connected to a water reservoir 25 equipped with a heater 27. Compartment B of the membrane unit is connected, sequentially to a back-pressure regulator 34, a condenser 35, and a vacuum pump 41. This arrangement is used to regulate water vapor supply to the gas-phase extraction fluid 31 entering the permeate side of the membrane while continuously removing the pervaporated ethanol from the emerging gas-phase extraction fluid 32. To obtain a water activity less than unity, the water vapor is supplied at a partial pressure lower than its vapor pressure at that temperature. This step is accomplished by adjusting the back-pressure regulator 34 to open whenever the permeate-side pressure is in excess of the target partial pressure. Ethanol and water vapors released through the back-pressure regulator 34 may be condensed and recovered.

5.2 ALCOHOL ENRICHMENT

Alcohol-enriched beverages whose organoleptic quality significantly surpasses those attainable by present means can be produced by the process described herein. Enrichment of ethanol through selective removal of water is accomplished by placing the beverage, the membrane, and the vapor-phase extraction fluid in a spatial arrangement shown in FIG. 11, which is similar to that shown in FIG. 5 except that ethanol vapor instead of water vapor is supplied to the gas-phase sweep stream or partial vacuum. Under these conditions, permeate-side ethanol activity in the gas-phase and the feed-side ethanol activity in the liquid phase are equalized, the driving force for diffusional ethanol transport is nullified according to the mathematical relationships shown in Section 5, supra, and preferential removal of water over ethanol results. The use of a membrane that is more permeable to water than to the congeners ensures that most of the congeners will be retained in the beverage during ethanol enrichment.

The present invention provides a method for producing from a first alcoholic beverage a second beverage of increased alcoholic content comprising:
providing a membrane which is water permeable;
feeding a first alcoholic beverage across a feed side of said membrane;
feeding a gas-phase extraction fluid across a permeate side of said membrane, said extraction fluid being water absorbing, but substantially not ethanol absorbing and said extraction fluid comprising ethanol vapor in an amount sufficient to minimize the diffusion of ethanol from said first alcoholic beverage to said permeate side of said membrane by balancing the activity of ethanol on said feed side of said membrane so as to evaporate into said gas-phase extraction fluid the portion of the water initially present in said first alcoholic beverage which has crossed to the permeate side of said membrane, thereby forming from said first alcoholic beverage a second beverage having increased alcoholic content; and
withdrawing said gas-phase extraction fluid containing ethanol vapor and water from said permeate side of said membrane, whereby said second beverage having increased alcoholic content is produced on said feed side of said membrane.

The gas-phase extraction fluid may be maintained in the gas-phase using either a non-condensable gas (e.g. air or nitrogen) or vacuum applied from a vacuum pump. The gas-phase extraction fluid further comprises ethanol vapor to balance the ethanol activities on the permeate and feed sides of the membrane, as will be discussed infra, The gas-phase extraction fluid may also comprise organic or inorganic components so as to prevent the permeation of such components present in the beverage across the membrane. These components may be naturally in the extraction fluid or they may be added selectively hereto. Although the present invention is primarily intended for water removal from beverages and the ethanol enrichment thereof, the process concept described herein can be applied generically to the selective removal of one or more volatile components from aqueous solutions while retaining other dissolved components.

A variety of process schemes are possible for equalizing feed- and permeate-side ethanol activities in vapor-arbitrated pervaporation.

The invention also relates to an apparatus for producing from a first alcoholic beverage a second beverage of increased alcoholic content comprising
- a membrane which is water permeable;
- means for feeding a first alcoholic beverage across a feed side of said membrane; and
- means for providing a gas-phase extraction fluid to a permeate side of said membrane;
- means for regulating the partial pressure of ethanol in the said gas-phase extraction fluid on said permeate side of said membrane; and
- whereby water diffuses from the first beverage through the membrane into said gas-phase extraction fluid to produce said second beverage on said feed side of said membrane having increased alcohol content and a gas-phase extraction fluid comprising ethanol vapor and water vapor on said permeate side of said membrane. Particular embodiments of the technology are described infra. In all cases relatively polar, hydrophilic membranes with good water/congener selectivity are assumed to be used.

Such a membrane is described further in Section 5.5, infra.

Although the present invention is primarily intended for ethanol enrichment in beverages, the concept described herein can be applied generally to the selective enrichment of one or more volatile components in solutions while retaining other dissolved volatile or nonvolatile components.

5.2.1 VAPOR-SWEPT SYSTEMS

Figure 12:
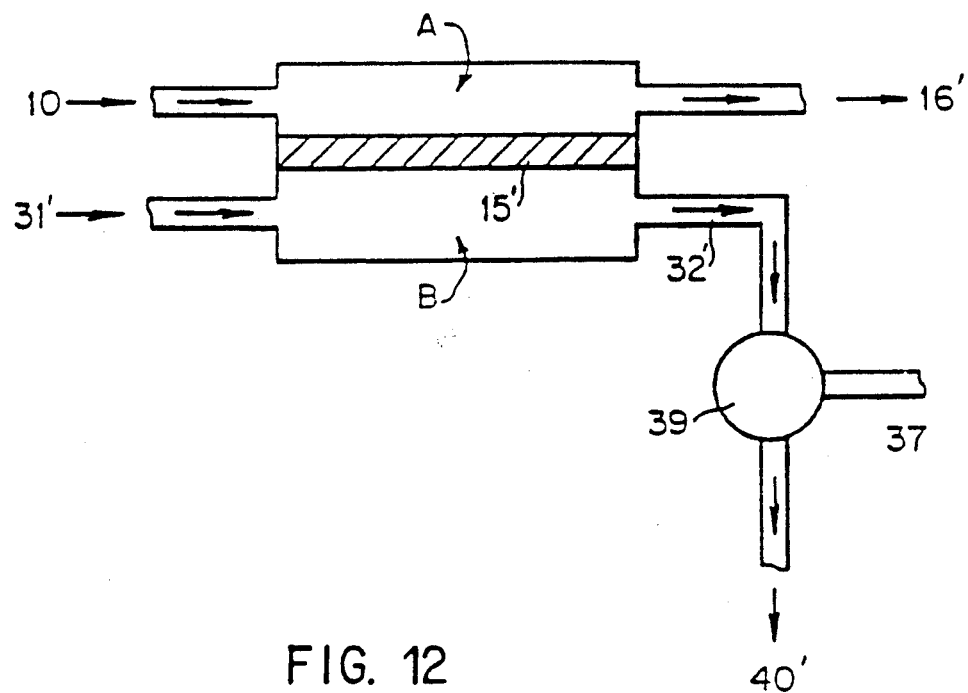
FIG. 12 illustrates one embodiment of the process for alcohol enrichment utilizing a vapor-swept system.

A preferred vapor-swept pervaporation system embodying the ethanol activity management concept is shown conceptually in FIG. 12. A membrane unit comprises two flow compartments, one on each side of the membrane 154'. Beverage 10 is fed to compartment A of the membrane unit, a gas-phase extraction fluid 31' comprising a mixture of noncondensable gas (such as air or nitrogen) and ethanol vapor is fed to the other compartment B as a sweep stream. A feed subsystem regulates the delivery rate and the temperature of the beverage; it also replenishes the latent heat of evaporation lost from the feed stream during water pervaporation. A sweep gas conditioning subsystem is used to regulate the temperature, ethanol content (and thus ethanol activity), and flow rate of the sweep stream. The beverage emerges with an increased alcoholic content 16'. An alcohol recovery subsystem 39 separates the water and ethanol 40' from the non-condensable gas 37 in the gas-phase extraction fluid that emerges 32'. Provided that the sweep stream flow rate is sufficiently high to prevent excess water accumulation on the permeate side of the membrane, the pervaporation and purging actions will continue to sustain water removal, and hence ethanol enrichment. Another function of the sweep stream is to help supply part of the latent heat of evaporation for water.

A source of ethanol is required to supply the permeate side of the membrane continually for the ethanol enrichment mode of vapor-arbitrated pervaporation to function. Because the cost of ethanol is much higher than that of water, and for environmental protection reasons, it is desirable to reuse the ethanol vapor in the gas-phase sweep stream.

Figure 13:
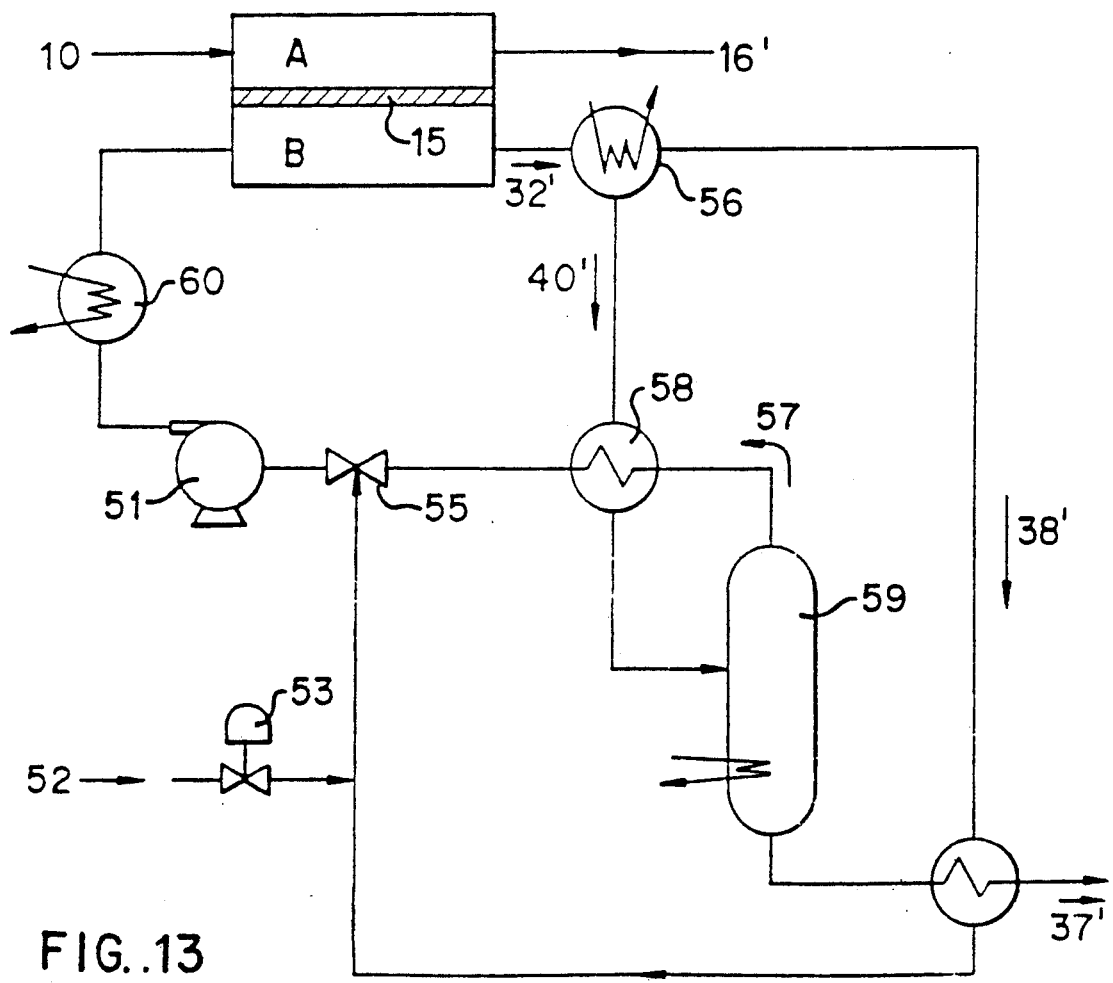
FIG. 13 illustrates a vapor-swept system incorporating means for ethanol vapor recycling.

A particularly preferred embodiment of the process incorporates the ethanol vapor recycle scheme shown in FIG. 13. The beverage 10 is circulated via a pump to compartment A of the membrane unit containing membrane 15'. The beverage emerges with a reduced water content 16'. A recirculation blower 51 feeds a sweep stream of non-condensable gas to compartment B of the membrane unit. Initially, ethanol is supplied from an external source 52 through a valve 53 and a mixing valve 55 into the gas-phase sweep stream until the concentration required to substantially equalize the ethanol activities on both sides of the membrane is reached. At that point the external ethanol supply is stopped, while the gas-phase sweep stream continues to be recirculated through compartment B of the membrane unit. Water from the beverage pervaporates through the membrane into the gas-phase sweep stream which emerges 32'. This sweep stream is partially condensed in a condenser 56 to obtain a liquid stream 40' which contains most of the water and part of the ethanol in the sweep stream, and a gas stream 38' which contains the remainder of the ethanol in vapor form plus essentially all of the non-condensable gas. The liquid stream 40' is sent through a heat exchanger 58 to a still 59, where ethanol vapor 57 is separated from liquid water 37'. The ethanol vapor 57 passes through the heat exchanger 58 where it preheats the condensed liquid to be distilled, and is blended into the recirculating gas-phase sweep stream through mixing valve 55. The gas stream 38' emerging from the condenser 56 is re-heated by heat exchanging with the water stream 37' from the still, and then combined with the ethanol vapor 57 for recirculation to compartment B of the membrane unit after temperature adjustment with heat exchanger 60.

Recovery of ethanol using this scheme can be quite efficient. First, as a result of the different volatilities of water and ethanol, the condenser may be operated at a temperature that is sufficiently low to condense most of the water from the sweep stream while leaving a substantial amount of ethanol in the vapor state. Clean separation of small quantities of ethanol from water is readily accomplished with a still with minimal fractionation capabilities. As a result, little ethanol is lost in the effluent water stream 37'. It also means that most of the ethanol is recycled without going through energy-intensive phase changes.

Under these conditions, the steady-state concentration of ethanol in the sweep stream will reach a point where virtually no net loss or gain of ethanol by the beverage occurs. The vapor arbitration process is self-regulating to some extent, in that if ethanol from the beverage begins to permeate into compartment B of the membrane unit, the concentration of ethanol in the sweep stream would increase. This situation would cause the ethanol concentrations in streams 32' and 38' to increase correspondingly. This higher ethanol concentration sweep stream is eventually recirculated to compartment B where it impedes further ethanol loss from the beverage.

Depending on the ethanol content of the beverage to be treated, the target ethanol level in the product beverage, and the process conditions, the gas-phase sweep stream emerging the membrane unit may contain a very small amount of ethanol. In such cases it may be possible to rely on the condenser 56 alone to separate water from the ethanol to be recycled without further distillation. This would be particularly desirable if the ethanol/water condensate has utility without further purification, such as in the manufacturing of certain beverages.

Figure 14:
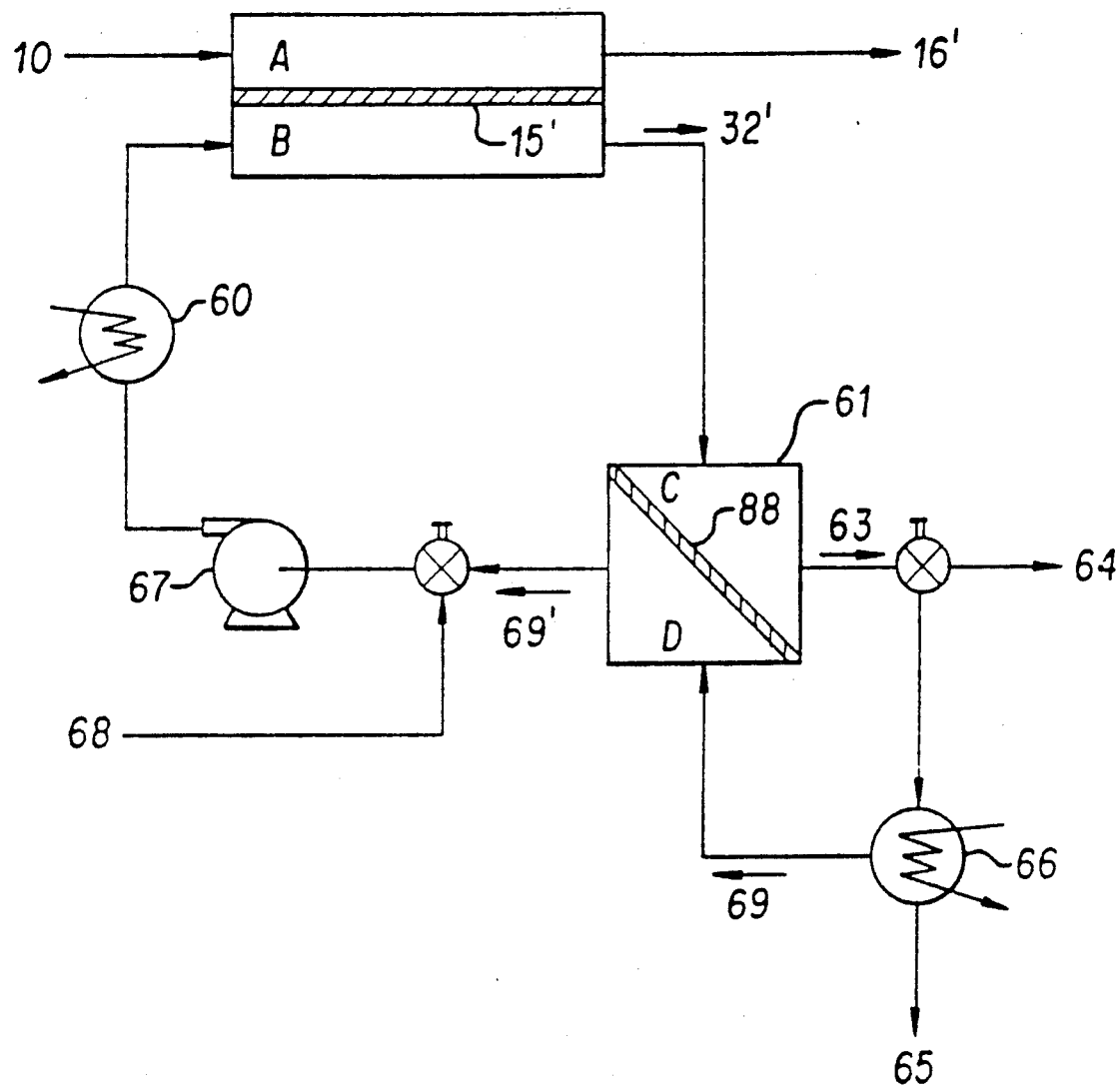
FIG. 14 illustrates yet another embodiment of the ethanol vapor management scheme of the present invention.

An alternative embodiment of the ethanol vapor management scheme is illustrated in FIG. 14. The gas-phase sweep stream 32' emerging from compartment B of the membrane unit is passed through a first compartment C of a second membrane unit 61 where it contacts one side of a membrane 88 which has the properties of being ethanol-absorbing but water non-absorbing. Most of the ethanol in the gas phase preferentially partitions into that membrane, leaving water vapor, trace quantities of ethanol vapor, and the non-condensable gas in stream 63. This stream may be vented 64 if air is used as the non-condensable gas or, if another non-condensable gas is employed, recirculated after removing the water 65 by condensation using condenser 66. Using air as the non-condensable gas 68 is preferred because it obviates capital and operating costs associated with condensing water from a humid sweep stream. In either case, the partially dehydrated non-condensable sweep gas 69 is passed, preferably countercurrently, through compartment D of the second membrane unit 61 where it contacts the second side of membrane 88 and receives the ethanol that had been stripped from stream 32'. A feed/recirculation blower 67 sends the ethanol-laden stream 69', which reaches a steady-state concentration needed to equalize ethanol activity across membrane 15', back to compartment B of the alcohol enrichment membrane unit after passing through heat exchanger 60 where the temperature is brought to the desired level.

A variety of ethanol recovery membranes (88) meet the requirements of this process. Examples include membranes that incorporate an extractant which is alcohol-absorbing but not water-absorbing, or polymer membranes with inherently high ethanol-water selectivities. More specifically, membranes of the first type may be (1) an immobilized liquid membrane where the extractant is held as a continuous phase in the pores of a microporous membrane; or (2) a polymeric membrane that has a high solubility for, and is hence swollen by, the extractant liquid with the result that the selective properties of the liquid extractant dominates the overall selectivity of the membrane. The liquid extractant used for this purpose should be low in toxicity (preferably falling within the GRAS, or Generally Recognized As Safe, classification of the U.S. Food and Drug Administration), has little taste or aroma, is stable toward oxidation (if air is used as the non-condensable gas), has a high capacity to dissolve ethanol and a large ratio of ethanol partition coefficient to water partition coefficient. Some example extractants are silicone oils (which comprise polydimethylsiloxanes of certain structures and molecular weight ranges), branched fatty alcohols in the C12 to C24 range (e.g. isostearyl alcohol, hexadecyl alcohol, eicosyl alcohol, etc.), and branched hydrocarbons containing up to about 24 carbon atoms that remain fluid at ambient temperatures.

Membranes of the second type include non-porous polymeric membranes that are relatively hydrophobic and which exhibits low permeability toward water, i.e. they should be good water barriers. The absolute ethanol/water permselectivity of the membrane is not particularly stringent in this application because further separation of ethanol vapor from liquid water is performed downstream by selective condensation (66 in FIG. 14). Candidate membrane materials meeting these criteria comprise certain silicone elastomers, polyolefins, and fluoropolymers.

Further variations of ethanol vapor management schemes are conceivable, including reversible absorption and stripping with selective ethanol extractants in classical gas/liquid contacting unit operations, as will be apparent to those skilled in the art.

5.2.2 VACUUM SYSTEMS

Figure 15:
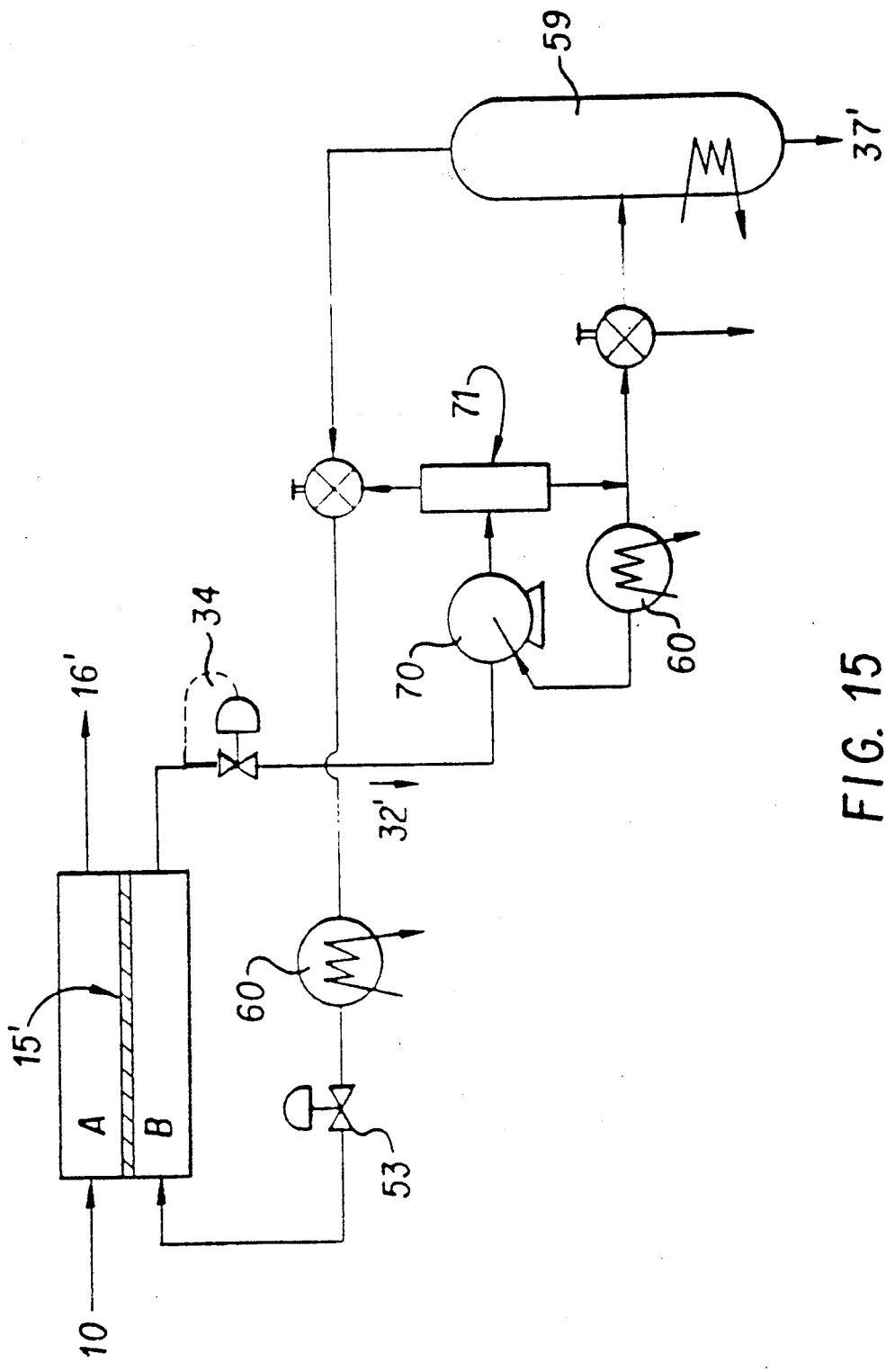
FIG. 15 shows a schematic diagram of an alcohol enrichment process which utilizes a vacuum system.

A pervaporation system embodying the ethanol activity equalization concept but which uses vacuum to remove the permeate is depicted in FIG. 15. The beverage 10 is fed into compartment A of the membrane unit containing the membrane 15' via a pump to produce a beverage of reduced water content and enriched ethanol content 16'. The outlet from compartment B of the membrane unit is connected to a liquid ring pump 70, which generates a partial vacuum to aid the evaporative removal of water that has permeated across the membrane from the beverage, and condenses, by compression, part of that permeate stream 32' which comprises a mixture of water and ethanol vapors. Under appropriate conditions, most of the water vapor would be recovered in the liquid condensate, while much of the ethanol vapor would be reclaimed in the gas phase using a vapor-liquid separator 71. Part of the condensate is recirculated within the pump to act as a compressant; the remainder of the condensate is removed. Optionally, this condensate may be distilled at 59 to remove the residual ethanol, which may be added to the recycled ethanol vapor stream emerging from the liquid ring pump. To obtain an ethanol activity less than unity, the ethanol vapor is returned to the permeate side of the membrane at a partial pressure lower than its vapor pressure. This step is accomplished by adjusting the pressure control valve 53 to open and to supply a measured amount of ethanol vapor into compartment B of the membrane unit.

5.3 FLAVOR AND AROMA ENRICHMENT

In flavor and aroma enrichment applications, vapor-arbitrated pervaporation processes are operated such that water and ethanol are removed at a given proportion until the required volume reduction, and optional changes in alcohol content, are reached. Unlike conventional membrane processes in which the membrane is the only source of selectivity, and therefore the separation of individual components depends mostly on the characteristics of the membrane and the components to be separated, the effective driving force of each component may be controlled independently in vapor-arbitrated pervaporation, whereby the relative transport rates of the components can be manipulated to differ substantially from those expected on the basis of membrane selectivities alone. In effect, the inherent selectivity of the membrane is complemented by active arbitration of the driving force for permeation of the volatile components to be retained or removed from a feed liquid.

Special cases of this unique ability of vapor-arbitrated pervaporation processes have been illustrated supra in the cases of selective alcohol reduction and alcohol enrichment. In those cases, the removal of one of the volatile components has to be minimized so as not to require replenishment or reconstitution. By contrast, the principal objective in flavor and aroma enrichment is to preserve as much of the solutes as possible while removing the cosolvents ethanol and water. It may be desirable to remove more water than ethanol, or conversely more ethanol than water, depending on the desired specification of the product. It may even be desirable to reduce the volume of the beverage with no significant change in its alcohol concentration. The ability to regulate this ratio is important because alcoholic beverages typically contain both water-soluble components and ethanol-soluble components in their natural state, and large changes in ethanol concentration may cause one or more of the components to precipitate or phase separate before the overall degree of concentration or volume reduction is reached. Such instabilities may be immediately evident, or they may be manifest in the form of reduced product stability during storage, transportation, and/or exposure to changing environmental conditions, especially temperature swings.

Figure 16:
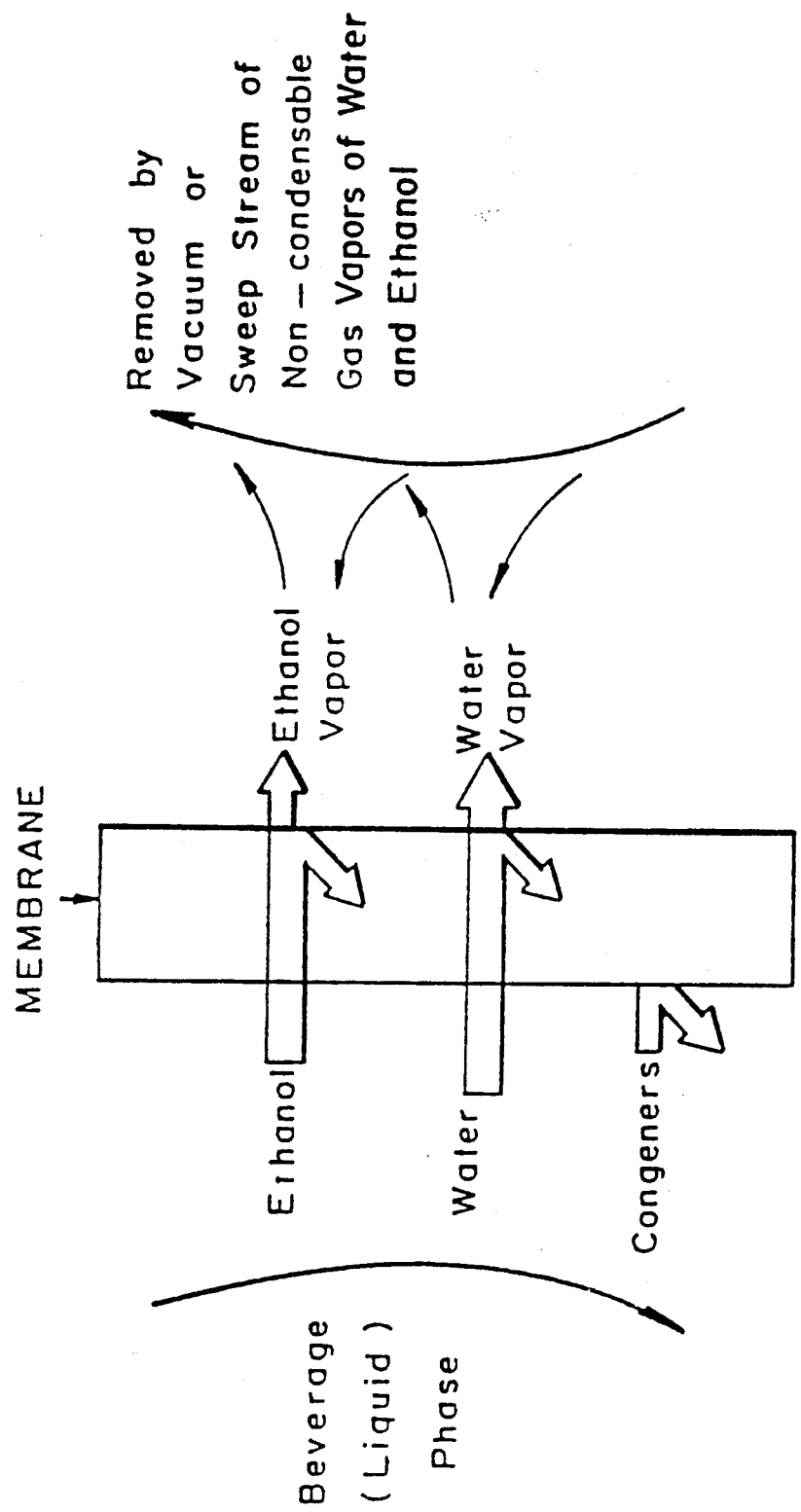
FIG. 16 illustrates the basic vapor-arbitrated pervaporation process for flavor and aroma enrichment of beverages.

These varied objectives can be accomplished with vapor-arbitrated pervaporation by adjusting the concentrations of ethanol and water in the gaseous sweep stream so that the concentration ratio of these components in the vapor phase complements the inherent selectivity ratio of the membrane to cause simultaneous removal of water and ethanol from the beverage in the desired ratio. This concept is illustrated in FIG. 16. If a constant alcohol concentration is needed, the concentration ratio of these components in the vapor phase should be adjusted so that water and ethanol are removed in exactly the same proportion as that present in the beverage phase. The product then has the same alcohol level as the original beverage, but is enriched in flavor and aroma components.

As with alcohol reduction or alcohol enrichment, a partial vacuum may be used to drive the permeation of the volatile component. Supplying measured concentrations of the component to be retained into the partial vacuum on the permeate side of the membrane again serves to oppose diffusional transport of that component from the beverage.

While two components can be removed simultaneously by means of conventional separation processes, and membrane processes in particular, this state often indicates a lack of sufficient selectivity. To attain cleaner separations, conventional membrane processes may be staged, sometimes involving recycling. Even then, it is seldom feasible to obtain every possible ratio of cosolvents in the final product. It is an important advantage of the present invention that a significant degree of control hitherto not achievable can be exerted over the final composition of the product liquid.

A further advantage of vapor-arbitrated pervaporation is related to the presence of a gas phase on the permeate side of the membrane. Even if they may not be completely retained by the membrane, nonvolatile components such as sugars, tannins etc. remain in the beverage because they cannot evaporate into the gas phase. This situation differs from that in reverse osmosis where the simultaneous removal of ethanol and water can lead to losses of volatile and nonvolatile components alike due to flow coupling, and where the liquid phase permeate is receptive to those components because of their inherent solubility in ethanol/water mixtures.

5.3.1 VAPOR-SWEPT SYSTEMS

Figure 17:
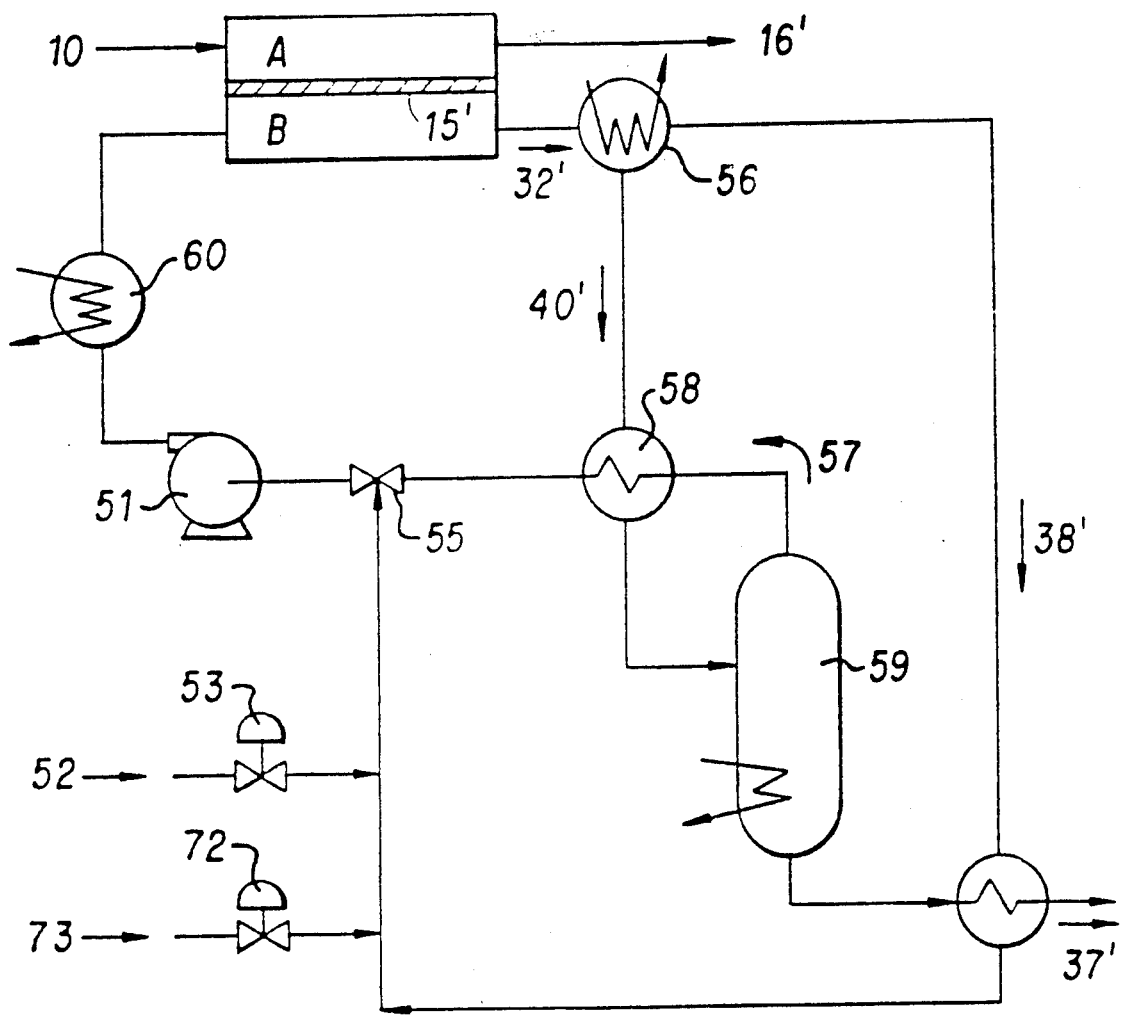
FIG. 17 illustrates a typical process scheme for the vapor-swept configuration useful for the dual vapor-arbitrated pervaporation process for flavor and aroma enrichment.

A particularly preferred embodiment of the vapor-arbitrated pervaporation process for flavor and aroma enrichment via volume reduction of ethanol and water is shown in FIG. 17. Similar to the operation of the alcohol enrichment system described in FIG. 13, the present embodiment incorporates reclamation of the ethanol vapor circulating in the vapor phase. In addition, a provision has been made to supply water vapor 73 into the gas-phase sweep stream at measured rates through valve 72. Means for generating suitable sources of water vapor have been described in Section 5.1, supra. The desired degree of vapor arbitration for ethanol and water is achieved by adjusting the rate of addition of those vapors.

5.3.2 VACUUM SYSTEMS

A vapor-arbitrated pervaporation system embodying the concept of simultaneous vapor arbitration for water and for ethanol are similar to those illustrated in FIGS. 10 and 15. This system creates a partial vacuum to provide the driving force for permeation in a manner similarly to that depicted previously.

If a lower ethanol concentration in the enriched product liquid compared to that in the original beverage is desired, then the vapor returned to the membrane unit should be relatively water-rich and ethanol-poor to encourage ethanol removal. This process may be accomplished by combining part of the ethanol vapor stream obtained at the condensation step with water vapor generated by re-evaporation of part of the condensed water (or with a regulated supply of fresh steam) such that the resultant ethanol concentration in the recirculating vapor provides more impedance to water removal than to ethanol removal. The portion of the ethanol vapor that is not reused may be sent to a separate reclamation step.

Conversely, if a higher ethanol concentration in the enriched product liquid compared to that in the original beverage is desired, then the vapor returned to the membrane unit should be relatively ethanol-rich and water-poor to encourage water removal. This process may be accomplished by decreasing the amount of re-evaporated water vapor or steam to be mixed with the ethanol vapor.

For the special case of enriching flavors and aromas by net volume reduction with no significant changes in ethanol concentration, the sweep stream emerging from the membrane unit is cooled to a temperature sufficiently low to liquify most of the water and ethanol. Part of this liquid is discharged, but part of it is reheated to process temperature, evaporated and recirculated to the permeate side of the membrane for vapor arbitration purposes.

In volume reduction applications, it is preferable to use the minimum practicable quantity of water vapor and ethanol vapor necessary to establish the desired concentration ratio of those components in the gas-phase. The driving force for pervaporation of water and ethanol from the feed liquid is thereby maximized. It is also possible to increase productivity by moderate pressure increases applied to the liquid phase.

5.4 VAPOR ARBITRATION FOR COMPONENTS OTHER THAN ETHANOL AND WATER

To the extent that no semipermeable membrane is perfectly selective, some permeation loss of volatile components from feed liquids can occur during pervaporation—including various implementations of vapor-arbitrated pervaporation processes—even if membranes considered to have good retentive properties are employed. Frequently such losses are acceptable because the changes in concentration are below the threshold of detection, or because those components do not contribute significantly to the overall quality of the product liquid. In certain cases such losses are welcome, as with acetaldehyde and methanol which have some degree of toxicity. In other cases, however, minute changes in the composition involving key flavor and aroma components are readily perceptible and the product then judged degraded.

The principles of vapor-arbitrated pervaporation can be universally applied to controlling the loss of volatile components from liquids. By introducing an appropriate amount of the same volatile component one wishes to preserve in the feed liquid into the permeate side of the membrane, transmembrane diffusion of that component can be attenuated to the point that retention can be considered essentially perfect. For example, ethyl acetate is a congener responsible for the characteristic bouquet of certain alcoholic beverages. It is highly volatile, relatively small in molecular size, and exhibits moderate solubility in many polymers, and can therefore permeate readily through a variety of membranes. To prevent its loss from the beverage, ethyl acetate vapor may be blended in the form of a vaporized additive at a measured rate into the sweep gas stream during vapor-arbitrated pervaporation. A low vapor-phase concentration usually suffices to halt any loss from the feed side because the ester is present only in trace quantities in most beverages. In this way, the quality of the beverage can be preserved better than has previously been possible with other processing methods. This general approach of using vaporized additives in vapor-arbitrated pervaporation may therefore be considered an effective means of compensating for imperfect selectivity, a goal not attainable with conventional membrane processes.

It is usually desirable to reclaim the vapor of the volatile minor component added for vapor arbitration purposes. This may be accomplished by a variety of methods, the proper choice of which depends on whether the vapor-arbitrated pervaporation process is operated in the alcohol reduction or alcohol enrichment mode, and on the relative volatilities of the minor component with respect to ethanol and water. Two representative cases are considered here:

(1) Alcohol reduction in a vapor-swept system (see FIG. 7-10 in Section 5.1.1, supra). where the permeate stream emerging from the membrane module may be condensed to separate the non-condensable gas, then fractionating the condensate to recover the minor component for recycle;

(2) Alcohol enrichment in a vapor-swept system (see FIG. 14 in Section 5.2.1, supra). If the minor component is much more volatile than water—as the case is with ethyl acetate—the condenser 56 may be operated at a temperature sufficiently low to liquify most of the water while leaving the ethanol and the minor component in the vapor stream to be recirculated directly to the membrane unit. Conversely, if the minor component is much less volatile than ethanol, then it may be condensed together with water (stream 40' in FIG. 13), then fractionated to regenerate its vapor for blending with the recirculating ethanol vapor stream.

Other schemes for recovering and recycling the minor component (as a volatile additive) are possible, as will be apparent to those skilled in the art of process design; these may be integrated with vapor-arbitrated pervaporation of this invention.

5.5 MEMBRANES

The membranes used in the alcohol removal methods of the present invention must have a high ethanol/congener selectivity when ethanol is removed by extraction with gas-phase extraction fluids. Specifically, the membranes should be highly permeable to ethanol and be permselective between ethanol and other organic components of the beverage. Similarly, the membranes used in the alcohol enrichment methods of the present invention must have a high water/congener selectivity when water is removed by extraction with gas-phase extraction fluids. Specifically, the membranes should be highly permeable to water and be permselective between water and other organic components of the beverage. Frequently, a given membrane suited for the purpose of alcohol reduction will also function properly for alcohol enrichment because its permeabilities toward ethanol and water are likely to be quite high compared to its permeabilities toward other beverage components. Because of the unique features of the present invention, the ethanol/water selectivity of the membrane is of secondary importance during vapor-arbitrated pervaporation. Finally, membranes intended for flavor and aroma enrichment should satisfy requirements similar to those discussed supra.

Bearing these conditions in mind, a number of types of membranes have potential applicability in this invention, and the choice will be influenced by economic considerations, the ethanol compatibility of the membrane, and its availability in high-surface-area configurations. For example, membranes constructed of crosslinked or uncrosslinked polymeric materials or more loosely organized elastomeric materials are suitable. Membranes that are now used for reverse osmosis (RO) are good candidates for use in this invention, because RO applications entail high transmembrane water fluxes of polar permeants (e.g., water). Membranes that permit rapid water permeation usually will be significantly permeable to ethanol as well.

Membranes which exhibit ethanol and/or water fluxes adequate for the present invention should be thin, nonporous, and may be derived from polymers that are crosslinked or uncrosslinked, glassy or rubbery, and water-swollen to various degrees. In our alcohol reduction tests (per Examples 1-5 in Section 6, infra), ethanol fluxes ranging from about 0.04 to 0.09 mL/cm$^2$-hr have been observed with a thin-film-composite crosslinked polyurea membrane, depending on the ethanol concentration in the feed beverage. Related permeation tests conducted in our laboratory comparing various membrane types showed the relative ethanol fluxes listed in Table II. Similarly, in alcohol enrichment and volume reduction tests (per Examples 6-9 in Section 6, infra), water fluxes between 0.008 and 0.015 mL/cm$^2$-hr were observed.

TABLE II

Relative Ethanol Removal Rates Among Different Membranes

| Membrane | Relative ethanol Flux |
| --- | --- |
| Crosslinked polyurea | 1.0 |
| Crosslinked polyamide | 0.67 |
| Cellulose acetate | 1.3 |
| Cellulose triacetate | 1.7 |
| Crosslinked polyvinyl-alcohol | 1.8 |
| Sulfonated polybenzimidazole | 1.7 |

The literature contains numerous references to membranes of varied compositions and structures. In general, membranes that are relatively hydrophilic (i.e. exhibiting higher permeabilities to water and ethanol than to higher alcohols) with fluxes comparable to those mentioned supra should be suitable from a production standpoint.

Table III shows the ethanol/congener selectivity of a hydrophilic, crosslinked polyurea membrane in terms of congener/ethanol permeability ratios. Clearly, ethanol permeated more rapidly across the membrane than did the higher alcohols and other congeners (with the exception of methanol—a desirable attribute because of the relatively high toxicity of that alcohol).

TABLE III

Selectivity Characteristics Of A Suitable Alcohol Reduction Membrane

| Congener | Permeability relative to that of ethanol |
| --- | --- |
| Methanol | 1.4 |
| Ethanol | 1.0 |
| 1-Propanol | 0.092 |
| i-Butanol | 0.10 |
| active Amyl alcohol | 0.081 |
| i-Amyl alcohol | 0.072 |
| Ethyl acetate | 0.44 |
| i-Amyl acetate | 0.45 |
| Acetic acid | 0.09 |

In view of the above considerations, a number of membrane types may be useful for the selective removal of ethanol from alcoholic beverages including, but not limited to, various aliphatic and aromatic polyamides, polyureas, polyetherureas, polyimides, polyoxazolines, polyetheraminotriazine, regenerated cellulose, cellulose acetate, cellulose triacetate, crosslinked polyvinyl alcohol, polyacrylonitrile and its copolymers (these polymers being particularly resistant to ethanol swelling), polybenzimidazole, and polybenzimidazolone, hydrophilic crosslinked vinyl polymers and copolymers, and ion-exchange membranes with various counterions.

Any membrane geometry is potentially applicable. In a preferred embodiment, a hollow-fiber module with high membrane area-to-module volume ratio is used. The flow of alcoholic beverage may be directed through the lumen of the hollow fibers and the gas-phase extraction fluid along the exterior shell of the fibers, or vice versa. The preferred configuration will depend on the pressure capability, wettability, and porosity of the fibers, as well as on the hydrodynamic and mass transfer characteristics of the modules containing them. The preferred operating pressures of the process depend on the specific embodiment. With humidified non-condensable gas as the sweep stream, the preferred gas stream pressure would be at 1 atm, or fractionally above 1 atm consistent with membrane module and piping pressure drops. The beverage stream will similarly be held at or about 1 atm to minimize the transmembrane pressure. Where vacuum operation is the preferred method of removing the pervaporated ethanol, then the permeate side of the membrane will be maintained at subatmospheric pressures.

6. EXAMPLES

Examples of the practice of the invention are as follows Examples 1-5 describe the removal of ethanol by the special pervaporation process of this invention. Examples 6-8 describe the enrichment of ethanol, and Example 9 describes the controlled removal of water and ethanol such that there is a net decrease in the volume but not a significant change in ethanol concentration of the feed.

6.1 EXAMPLE NOS. 1 AND 2

Figure 9:
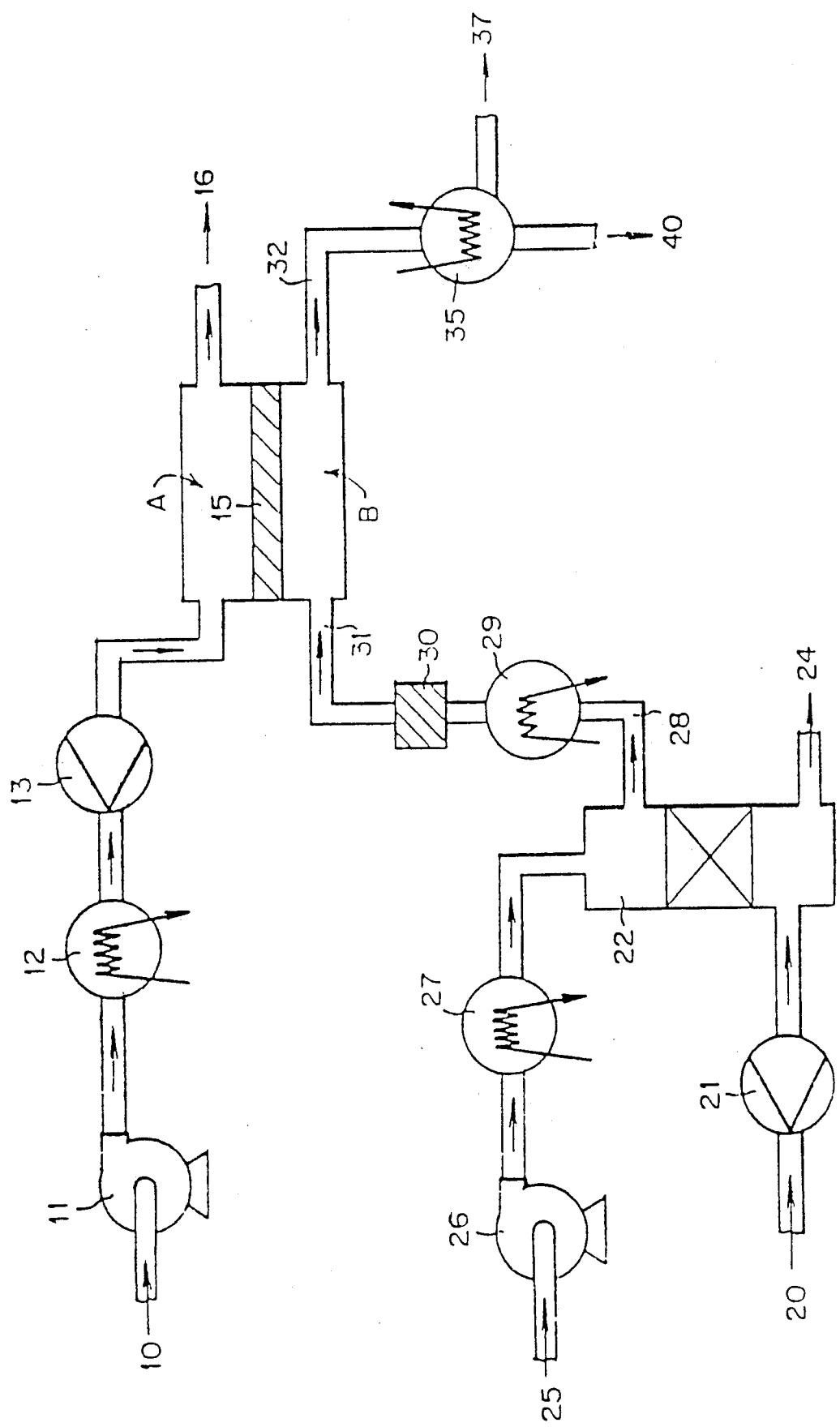
FIG. 9 shows a bench-scale apparatus for pervaporation removal of ethanol from beverages using a vapor-swept system.

An alcohol reduction apparatus shown schematically in FIG. 9 comprises a membrane module, a feed beverage recirculation subsystem, an air supply subsystem with adjustable flow rate, temperature, and relative humidity, and an ethanol recovery subsystem. The membrane module is of a plate-and-frame modular construction that allows circulation on both sides of the membrane unit and contains 1700 $cm^2$ of effective membrane area.

The alcohol-reduced beverage is obtained using substantially the same procedure as described in Section 5.1.1, above, for the operation of the apparatus shown in FIG. 9. Feed Wine (Robert Mondavi 1985 Cabernet Red Table Wine) is circulated on the feed side of the membrane, while the gas-phase extraction fluid, a humidified air sweep stream, is delivered to the permeate side of the membrane unit. Two wine samples are generated under conditions which are summarized in Table IV, infra.

TABLE IV

| | Example 1 | Example 2 |
| --- | --- | --- |
| Initial wine volume (mL) | 959 | 315 |
| Initial alcohol concn. (%) | 12 | 12.4 |
| Final wine volume (mL) | 889 | 284 |
| Final alcohol concn. (%) | 7.8 | 6.5 |
| Processing time (hrs) | 6.8 | 2 |
| Wine temperature (°C.) | 25.2 ± 2 | 27.5 ± 0.1 |
| Wine flow rate (mL/min) | 500 | 420 |
| Sweep air temperature (°C.) | 26 ± 1.5 | 26.5 ± 0.3 |
| Sweep air flow rate (L/min) | 11.5 | 11.5 |
| Relative humidity of sweep air stream (%) | 89 ± 6 | 96 ± 3 |
| Ethanol flux ($10^{-3}$ mL/$cm^2$-hr) | 3.9 | 6 |
| Water flux ($10^{-3}$ mL/$cm^2$-hr) | 2.6 | 3.7 |

The alcohol-reduced samples retain virtually all of the flavor and bouquet of the original wine. More ethanol is present in the pervaporate than water, showing that alcohol is selectively removed from the beverage. Errors in measuring relative humidities close to the dew point limited the precision of water activity balance across the membrane, with the result that some water is also pervaporated from the wine. However, the quantity of water which is removed represents a much smaller fraction of its original volume in the wine than was the case with ethanol. Thus, the alcohol concentration of the finished wine decreases substantially, but the water concentration remains almost unchanged.

6.2 EXAMPLE NOS. 3 AND 4

Whiskies are alcoholic distillates from fermented mash of grain, stored in oak containers for maturation.

Two examples are disclosed to illustrate the application of the present process to removing ethanol from whiskies. An alcohol reduction apparatus similar to that described in Examples 1 and 2 is equipped with a plate-and-frame membrane stack containing 2030 cm$^2$ of effective membrane area. Feed whisky (Early Times TM) is obtained directly from the barrel nominally at 130 proof, i.e. 65 vol % ethanol. Whisky and humidified air are supplied to the membrane as described in the preceding Section. Ethanol in the sweep air stream is recovered in a condenser. The experimental conditions and results are shown in Table V infra.

TABLE V

|  | Example 3 | Example 4 |
|---|---|---|
| Initial whisky volume (mL) | 1160 | 1410 |
| Initial alcohol concn. (%) | 65.3 | 59.7 |
| Final whisky volume (mL) | 670 | 940 |
| Final alcohol concn. (%) | 41.9 | 38.8 |
| Processing time (hrs) | 2.6 | 3.1 |
| Whisky temperature (°C.) | 30 | 30 |
| Whisky flow rate (mL/min) | 500 | 420 |
| Sweep air temperature (°C.) | 30 | 30 |
| Sweep air flow rate (L/min) | 22.5 | 22.5 |
| Relative humidity of sweep air stream (%) | 77 ± 2 | 80 ± 2 |
| Ethanol flux ($10^{-3}$ mL/cm$^2$-hr) | 92 | 77 |
| Water flux ($10^{-3}$ mL/cm$^2$-hr) | 6.9 | 2.4 |
| Ethanol concentration in condensed permeate (%) | 80 | 79.9 |

Both alcohol-reduced whisky samples exhibit the taste and aroma character of the original material, but at substantially higher intensity. The product whiskies also show a deeper amber color compared with the feed. This result is due to the very good retention properties of the membrane and the concentration effect associated with the approximately one-third decrease in feed volume after processing.

The high rates of ethanol removal observed are attributable to the high alcohol concentration in whisky. The relative humidity required to balance water activities on the feed and permeate sides of the membrane is about 80%, substantially lower than that needed for processing wines. This result is consistent with the fact that whiskies contain less water than do wines and hence have lower water activities. The ratio of ethanol flux to water flux is about 13 in Example 3, and about 32 in Example 4. Water lost from the whisky represents about 1 to 2 percent of the feed volume. This observation means that almost all of the water in the feed beverage is preserved. Feed whisky flow rates above about 300 mL/min have little effect on the performance of the system.

Notably, the ethanol recovered as condensate is quite high in concentration and carries with it a high value as a marketable commodity.

6.3 EXAMPLE NO. 5

A brandy is a distilled spirit derived from wine or fermented fruit juice. This example illustrates the alcohol reduction of a cognac (a brandy produced in the Cognac region in France). An alcohol reduction apparatus similar to that described in Examples 1 and 2 is equipped with a plate-and-frame membrane stack containing 1020 cm$^2$ of effective membrane area. Feed brandy (Remy Martin VSOP available commercially which contains about 40 vol % ethanol) and humidified air are supplied to the membrane as described in the preceding examples. Ethanol in the gas-phase extraction fluid is recovered in a condenser. Experimental conditions and results are shown in Table VI, infra.

TABLE VI

| Initial brandy volume (mL) | 775 |
|---|---|
| Initial alcohol concn. (%) | 38.5 |
| Final brandy volume (mL) | 675 |
| Final alcohol concn. (%) | 28.6 |
| Processing time (hrs) | 1.7 |
| Brandy temperature (°C.) | 30 |
| Brandy flow rate (mL/min) | 680 |
| Sweep air temperature (°C.) | 30 |
| Sweep air flow rate (L/min) | 30 |
| Relative humidity of sweep air stream (%) | 84 ± 2 |
| Ethanol flux ($10^{-3}$ mL/cm$^2$-hr) | 62 |
| Water flux ($10^{-3}$ mL/cm$^2$-hr) | 0.84 |
| Retention of C$_5$ alcohols | 93 |
| Ethanol concentration in condensed permeate (%) | 42.2 |

Water activity balance is essentially perfect in this example. Water flux is only 1.4% of the ethanol flux, indicating that the membrane process is almost perfectly selective with respect to ethanol/water selection. The organoleptic quality of the low-alcohol brandy is very close to that of the original. Also, 93% of the two amyl-alcohols is retained. These results indicate that the membrane exhibits a very high ethanol/congener selectivity.

6.4 EXAMPLE NOS. 6 AND 7

The examples described herein relate to the alcohol enrichment aspect of the present invention.

Figure 18:
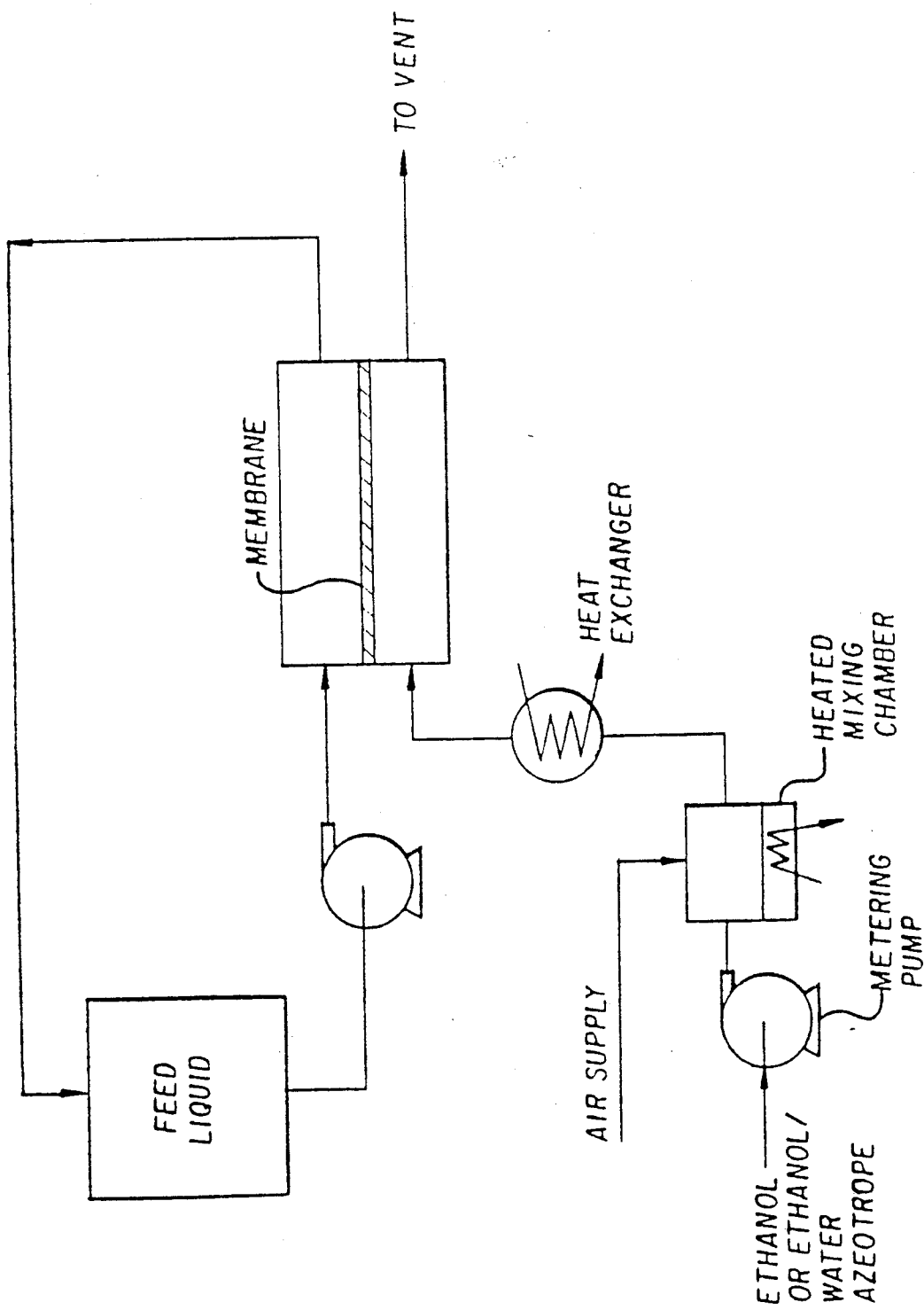
FIG. 18 illustrates a particular embodiment of the alcohol-enrichment aspect of the present invention.

An apparatus shown schematically in FIG. 18 comprises a membrane module, a feed beverage recirculation subsystem, an air supply subsystem with adjustable flow rate and temperature, and an ethanol vapor supply subsystem comprising a metering pump and a heated vaporization/mixing chamber. The membrane unit is of a plate-and-frame modular construction containing 4050 cm$^2$ of a polyurea thin-film composite membrane.

A beverage or alcohol-containing solution is fed into one side of the membrane module at a given flow rate and temperature. Liquid ethanol or ethanol/water azeotrope (95% ethanol) is fed by the metering pump into the mixing chamber heated to approximately 80° to 90° C., where all of the liquid is vaporized. Air is pumped through the mixing chamber and blends with the ethanol vapor to a predetermined ethanol concentration. This sweep stream is brought to operating temperature in a heat exchanger and delivered to the permeate side of the membrane module.

To illustrate the concept of alcohol enrichment, an ethanol-water mixture containing about 20 vol % ethanol and trace amounts of amyl alcohol (as a model congener) is circulated on the feed side of the membrane, and an air stream containing between 2.3 and 2.6% ethanol vapor is passed along the permeate side of the membrane. Two samples are produced under conditions summarized in Table VII, infra These product liquids contain reduced amounts of water but most of the ethanol and any alcohol in the original mixture. In the case of Example 6, the water flux is over a hundred fold higher than the ethanol flux, and little ethanol is lost from the original liquid mixture; these results indicate that vapor arbitration with respect to ethanol performs as expected. There is also a marked increase in the concentration of the amyl alcohol in the feed. Hence one might anticipate that a beverage or flavor extract can be partially depleted of its water content to enhance its ethanol and congener content effectively.

TABLE VII

| Alcohol Enrichment in Ethanol/Water Mixtures | | |
|---|---|---|
| | Example 6 | Example 7 |
| Initial ethanol/water mixture volume (mL) | 1970 | 1960 |
| Initial ethanol concn. (vol %) | 19.7 | 19.9 |
| Final ethanol/water mixture volume (mL) | 1430 | 1150 |
| Final ethanol concn. (vol %) | 26.9 | 31.1 |
| Processing time (hrs) | 12.8 | 20.8 |
| Ethanol/water mixture temp (°C.) | 25 | 25 |
| Ethanol/water flow rate (L/min) | 0.730 | 0.770 |
| Sweep stream temperature (°C.) | 28 | 28 |
| Sweep stream flow rate (L/min) | 29 | 30 |
| 95% ethanol input rate (mL/min) | 1.77 | 1.96 |
| Ethanol flux ($10^{-3}$ mL/cm$^2$-hr) | 0.13 | 0.56 |
| Water flux ($10^{-3}$ mL/cm$^2$-hr) | 15.0 | 13.5 |
| Ethanol permeated as % of feed | 0.2 | 1.6 |
| Water permeated as % of feed | 27 | 40 |
| Initial amyl alcohol concn. in feed liquid (ppm) | 36 | 36 |
| Final amyl alcohol concentration in feed liquid (ppm) | 44 | 51 |

6.5 EXAMPLE NO. 8

An alcohol-enriched sake sample is generated by increasing its ethanol concentration from about 20 to 25 vol % under conditions shown in Table VIII. The membrane and apparatus employed are similar to those described in Example 6. Using the method of ethanol vapor arbitration, about 20% of the water present in the original beverage is removed, but only 0.5% of the ethanol is lost. The resultant sake is noticeably enriched in taste. This example illustrates the fact that the same preselected membrane can be used for alcohol reduction or alcohol enrichment simply by manipulating sweep stream conditions.

TABLE VIII

| Alcohol Enrichment in Sake | |
|---|---|
| Initial sake volume (mL) | 1180 |
| Initial ethanol concn. (vol. %) | 20.2 |
| Final sake volume (mL) | 934 |
| Final ethanol concn. (vol. %) | 24.9 |
| Processing time (hrs) | 7.1 |
| Processing temperature (°C.) | 25 |
| Vapor pressure of pure ethanol (mmHg) | 59.1 |
| Log-mean average partial pressure of ethanol in the feed (mmHg) | 16.9 |
| Log-mean average partial pressure of ethanol in the sweep stream (mmHg) | 16.3 |
| Ethanol saturation ratio | 0.29 |
| Sake flow rate (L/min) | 0.875 |
| Sweep air flow rate (L/min) | 29.7 |
| 95% ethanol addition rate (mL/min) | 1.62 |
| Ethanol content in air stream (%) | 2.12 |
| Ethanol flux ($10^{-3}$ mL/cm$^2$-hr) | 0.19 |
| Water flux ($10^{-3}$ mL/cm$^2$-hr) | 8.4 |
| Ethanol permeated as % of feed | 0.5 |
| Water permeated as % of feed | 20.4 |

6.6 EXAMPLE NO. 9

The following example pertains to net volume reduction of an ethanol-water mixture by simultaneous removal of both water and ethanol at precisely the proportion required to avoid changing the ethanol concentration of the liquid feed. Conditions of this test are shown in Table IX, infra. The membrane and apparatus used are the same as those described in Example 6, supra.

TABLE IX

| Volume Reduction of an Ethanol-Water Mixture with Limited Concentration Change | |
|---|---|
| Initial ethanol-water mixture volume (mL) | 2345 |
| Initial ethanol concn. (vol %) | 20.6 |
| Final ethanol-water volume (mL) | 1511 |
| Final ethanol concn. (vol %) | 20.3 |
| Processing time (hrs) | 22 |
| Processing temperature (°C.) | 25 |
| Vapor pressure of pure ethanol (mmHg) | 59.1 |
| Log-mean average partial pressure of ethanol in the feed (mmHg) | 15.2 |
| Log-mean average partial pressure of ethanol in the sweep stream (mmHg) | 12.8 |
| Flow rate of ethanol-water feed solution (L/min) | 0.766 |
| Sweep air flow rate (L/min) | 29.7 |
| 95% ethanol addition rate (mL/min) | 1.2 |
| Ethanol content in air stream (%) | 1.65 |
| Ethanol flux ($10^{-3}$ mL/cm$^2$-hr) | 1.98 |
| Water flux ($10^{-3}$ mL/cm$^2$-hr) | 7.56 |
| Ethanol permeated as % of feed | 7.5 |
| Water permeated as % of feed | 28.7 |

The unique capability of vapor-arbitrated pervaporation processes for achieving a constant solvent composition during volume reduction is illustrated in this test. In the course of reducing the volume of the feed liquid by about one-third, the net change in ethanol concentration is only about 1.5%. This reduction is achieved by adjusting the driving forces for the transport of ethanol and water so that their fluxes differ by a factor of about four, corresponding approximately to the volume ratio of those two solvents in the feed liquid (neglecting effects of nonideal mixing on volume additivity). To the extent that the membrane used is similar to that employed in previous examples, substantial retention of congeners is expected to occur if those components had been present in the feed liquid, in which case an enhancement of flavors and aromas would result.

As will be apparent to those skilled in the art, many modifications and variations of this invention may be made without departing from its spirit and scope. The specific embodiments described herein are offered by way of example only, and the invention is limited only by the terms of the appended claims.

What is claimed:

1. A method comprising manipulating the concentration of at least one preselected member of a plurality of volatile components including an alcohol and water present in an alcoholic beverage in which substantially any predetermined desired concentrations of alcohol and water in an alcoholic beverage are provided, while preserving the flavor and aroma of the alcoholic beverage by;

(a) providing a membrane having a feed side and a permeate side opposite feed side, said membrane being permeable to said at least one preselected member;

(b) contracting said alcoholic beverage against said feed side of said membrane;

(c) contacting a gas-phase extraction fluid against said permeate side membrane, said extraction fluid comprising a vapor mixture capable of arbitrating the pervaporation of said volatile components such that a portion of said preselected member passes from said feed side of said membrane to said permeate side of said membrane and mixes with said extraction fluid, while a substantial portion of the remaining members of said plurality of volatile components is retained in said alcoholic beverage on said feed side of said membrane; and (d) allowing said alcoholic beverage and said extraction fluid to remain in contact with said feed side and said permeate side of said membrane, respectively, for a period of time sufficient to provide a second liquid on said feed side of said membrane in which the concentration of said preselected member has been manipulated to the desired level.

2. The method of claim 1 which further comprises recovering said preselected member of said plurality of volatile components which preselected member has become mixed with said extraction fluid.

3. The method of claim 2 which further comprises recycling at least a portion of said extraction fluid, from which said preselected member has been recovered, for recontacting against said permeate side of said membrane.

4. The method of claim 1 which further comprises maintaining said permeate side of said membrane at a pressure which is lower than that of said feed side of said membrane.

5. The method of claim 1 which further comprises regulating the pressure differential between said feed side of said membrane and said permeate side of said membrane.

6. The method of claim 4 or 5 in which said pressure is maintained or regulated with the aid of a vacuum pump.

7. The method of claim 1 which further comprises regulating the flow rate of said alcoholic beverage, said extraction fluid or both against the appropriate side of said membrane.

8. The method of claim 1 which further comprises regulating the temperature of said alcoholic beverage, said extraction fluid or both.

9. The method of claim 8 in which said temperature ranges from about 4°C. to about 75°C.

10. The method of claim 1 which further comprises varying the ratio of the flow rate of the alcoholic beverage to the area of the membrane which is in contact with said alcoholic beverage.

11. The method of claim 1 in which said preselected member is an alcohol having 1 to 3 carbon atoms.

12. The method of claim 11 in which said remaining members comprise native water and congeners present in said alcoholic beverage.

13. The method of claim 1 in which said preselected member is ethanol.

14. The method of claim 13 in which said remaining members comprise native water and congeners present in said alcoholic beverage.

15. The method of claim 11 or 13 in which said vapor mixture comprises a non-condensable gas and water vapor.

16. The method of claim 11 or 13 in which said vapor mixture comprises air and water vapor.

17. The method of claim 11 or 13 in which said vapor mixture comprises nitrogen and water vapor.

18. The method of claim 1 in which said preselected member is water.

19. The method of claim 18 in which said remaining members comprise native alcohol and congeners present in said alcoholic beverage.

20. The method of claim 18 in which said remaining members comprise native ethanol and congeners present in said alcoholic beverage.

21. The method of claim 18 in which said vapor mixture comprises a non-condensable gas and ethanol vapor.

22. The method of claim 18 in which said vapor mixture comprises a non-condensable gas and vapor obtained from the azeotrope of ethanol-water.

23. The method of claim 18 in which said vapor mixture comprises a non-condensable gas and a vapor obtained from recycled extraction fluid.

24. The method of claim 1 in which said preselected members include water and ethanol.

25. The method of claim 24 in which said vapor mixture comprises a non-condensable gas and an ethanol-water vapor having a predetermined composition.

26. The method of claim 1 in which said remaining members comprise congeners present in said alcoholic beverage.

27. The method of claim 26, 12, 14, 19 or 20 in which said congeners comprise compounds which contribute to the flavor, aroma or color of said alcoholic beverage.

28. The method of claim 1 in which said extraction fluid further comprises a sufficient amount of congeners comprising compounds which contribute to the flavor, aroma or color of said alcoholic beverage such that the transmembrane diffusion of the corresponding compounds which are native to said alcoholic beverage is substantially prevented.

29. The method of claim 1 in which said extraction fluid further comprises a sufficient amount of selected vaporized additives.

30. The method of claim 29 in which said selected vaporized additives are selected from the group consisting of organic compounds, inorganic compounds or both.

31. A method comprising: enriching the concentration of native ethanol in an alcoholic beverage in which substantially any predetermined desired concentrations of ethanol and water in an alcoholic beverage is provided, while preserving the flavor and aroma of the alcoholic beverage by, (a) providing a membrane having feed side and a permeate side opposite said feed side, said membrane being permeable to water;

(b) contacting said alcoholic beverage against said feed side of said membrane;

(c) contacting a gas-phase extraction fluid against said permeate side of said membrane, said extraction fluid comprising an ethanol vapor mixture capable of arbitrating the pervaporation of said native ethanol such that a portion of the water present in said alcoholic beverage passes from said feed side of said membrane to said permeate side of said membrane and mixes with said extraction fluid, while a substantial proportion of said native ethanol is retained in said alcoholic beverage on said feed side of said membrane; and (d) allowing said alcoholic beverage and said extraction fluid to remain in contact with said feed side and said permeate side of said membrane, respectively, for a period of time sufficient to provide a second liquid on said feed side of said membrane in which the concentration of said native ethanol has been enriched to the desired level.

32. A method comprising: reducing the volume of an alcoholic beverage comprising at least two volatile solvents including an alcohol and water in which substantially any predetermined desired concentrations of alcohol and water in an alcoholic beverage is provided, while preserving the flavor and aroma of the alcoholic beverage by,
(a) providing a membrane having a feed side and a permeate side opposite said feed side, said membrane being permeable to said at least two volatile solvents;
(b) contacting said alcoholic beverage against said feed side of said membrane;
(c) contacting a gas-phase extraction fluid against said permeate side of said membrane, said extraction fluid comprising a mixture of said volatile solvents such that a portion of the corresponding solvents which are native to said alcoholic beverage passes from said feed side of said membrane to said permeate side of said membrane at a preselected flux ratio and mixes with said extraction fluid, such that the resultant volume-reduced liquid contains the desired proportion of said native volatile solvents; and
(d) allowing said alcoholic beverage and said extraction fluid to remain in contact with said feed side and said permeate side of said membrane, respectively, for a period of time sufficient to provide a second liquid on said feed side of said membrane having a volume which has been reduced to the desired level.

33. The method of claim 32 in which said volatile solvents include ethanol and water.

34. A method comprising reducing the volume of an alcoholic beverage while substantially maintaining the initial proportion of native ethanol and water therein in which substantially any predetermined desired concentration of alcohol and water in an alcoholic beverage is provided, while preserving the flavor, by,
(a) providing a membrane having a feed side and a permeate side opposite said feed side, said membrane being permeable to ethanol and water;
(b) containing said alcoholic beverage against said feed side of said membrane;
(c) contacting a gas-phase extraction fluid against said permeate side of said membrane, said extraction fluid comprising a mixture of ethanol and water vapor in a predetermined ratio capable of arbitrating the pervaporation of said native ethanol and water such that a portion of said native ethanol and water present in said alcoholic beverage passes from said feed side of said membrane to said permeate side of said membrane, at an ethanol flux to water flux ratio corresponding to the molar ratio of ethanol to water in said alcoholic beverage and mixes with said extraction fluid, while the proportion of said native ethanol and water retained in said alcoholic beverage on said feed side of said membrane corresponds substantially to the initial proportion present in said alcoholic beverage; and
(d) allowing said alcoholic beverage and said extraction fluid to remain in contact with said feed side and said permeate side of said membrane, respectively, for a period of time sufficient to provide a second alcoholic beverage on said feed side of said membrane having a volume which has been reduced to the desired level.

35. The method of claim 34 in which said alcoholic beverage comprises an alcohol-containing flavor extract.

36. The method of claim 34 in which said alcoholic beverage comprises an alcohol-containing aroma extract.

37. The method of claim 34 in which said alcoholic beverage comprises an alcohol-containing color extract.

38. The method of claim 31, 32 or 34 in which said alcoholic beverage is selected from the group consisting of wine, sparkling wine, whisky, brandy, sake, beer or a fermented fruit drink.

39. A vapor-arbitrated pervaporation method comprising: selectively reducing the amount of a first volatile component including an alcohol and water present in an alcoholic beverage having at least two volatile components independent of the permselectivity of a membrane utilized in said method against one or the other of said volatile components comprising providing substantially andy predetermined desired concentration of alcohol and water in an alcoholic beverage, while preserving the flavor and aroma of the alcoholic beverage, by,
(a) providing a membrane having a feed side and a permeate side, said membrane being permeable to at least a first volatile component;
(b) contacting an alcoholic beverage containing said first volatile component and at least a second volatile component against said feed side of said membrane;
(c) contacting a gas-phase extraction fluid against said permeate side of said membrane, said extraction fluid comprising a mixture of a carrier gas and a sufficient amount of the vapor of said second volatile component such that a portion of said first volatile component passes from the feed side of said membrane to the permeate side of said membrane and mixes with said extraction fluid, while a substantial portion of said second volatile component is retained on the feed side of said membrane; and
(d) allowing said alcoholic beverage and said extraction fluid to remain in contact with the feed and permeate sides of said membrane, respectively, for a period of time sufficient to reduce the amount of said first volatile component in said alcoholic beverage to the desired level.

40. The method of claim 39 in which said carrier gas comprises a gas which does not condense to a significant degree under conditions which are sufficient to condense the volatile components of interest in said alcoholic beverage.

* * * * *